(12) United States Patent
Vora et al.

(10) Patent No.: US 12,345,887 B2
(45) Date of Patent: Jul. 1, 2025

(54) TECHNIQUES FOR CONTROLLING OVERBURDEN PLANARIZATION

(71) Applicant: Meta Platforms Technologies, LLC, Menlo Park, CA (US)

(72) Inventors: Ankit Vora, Bothell, WA (US); Keren Zhang, Woodinville, WA (US); Matthew E. Colburn, Woodinville, WA (US); Feyza Dundar Arisoy, Redmond, WA (US); Igor Abramson, Duvall, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 211 days.

(21) Appl. No.: 17/571,990

(22) Filed: Jan. 10, 2022

(65) Prior Publication Data
US 2024/0151971 A1    May 9, 2024

Related U.S. Application Data

(60) Provisional application No. 63/138,084, filed on Jan. 15, 2021.

(51) Int. Cl.
G02B 27/01    (2006.01)
G02B 1/14     (2015.01)
G02B 5/18     (2006.01)

(52) U.S. Cl.
CPC ........... *G02B 27/0172* (2013.01); *G02B 1/14* (2015.01); *G02B 5/1866* (2013.01);
(Continued)

(58) Field of Classification Search
CPC .... G02B 27/0172; G02B 1/14; G02B 5/1866; G02B 2027/0178; G02B 2027/0194; G02B 1/118; G02B 1/18; G02B 5/1804; G02B 5/1819; Y10T 428/24364; Y10T 428/24355; B32B 3/26; B32B 3/263;
(Continued)

(56) References Cited

U.S. PATENT DOCUMENTS 5,082,629 A      1/1992  Burgess, Jr. et al.
9,519,089 B1 *  12/2016  Brown .................... G02B 5/18
(Continued)

OTHER PUBLICATIONS

International Search report and Written Opinion for International Application No. PCT/US2022/029976, mailed Sep. 30, 2022, 10 pages.
(Continued)

*Primary Examiner* — Zachary M Davis
(74) *Attorney, Agent, or Firm* — Greenberg Traurig, LLP

(57) ABSTRACT

A method of planarizing an overcoat layer on a surface-relief grating includes dispensing a layer of a resin material that is curable by heat or electromagnetic radiation on a surface-relief grating that includes a plurality of grating grooves, pressing the layer of the resin material using a planar imprint stamp, curing the resin material in the layer of the resin material, and detaching the planar imprint stamp from the layer of the resin material. In one example, a thickness of the overcoat layer on top of grating ridges of the surface-relief grating is equal to or less than 20 nm, and a surface peak-to-valley height of a top surface of the overcoat layer is equal to or less than 5 nm.

5 Claims, 18 Drawing Sheets

(52) U.S. Cl.
CPC ........... *G02B 2027/0178* (2013.01); *G02B 2027/0194* (2013.01); *Y10T 428/24364* (2015.01)

(58) Field of Classification Search
CPC ........... C09D 7/47; B81C 1/00611; B81C 2201/0118; B81C 2201/0119
See application file for complete search history.

(56) References Cited

U.S. PATENT DOCUMENTS

| | | | |
|---|---|---|---|
| 12,104,784 B2 | 10/2024 | Nishikawa et al. | |
| 2003/0068657 A1 | 4/2003 | Lin et al. | |
| 2005/0196528 A1* | 9/2005 | Akiyoshi | H10K 59/35 427/68 |
| 2006/0192483 A1* | 8/2006 | Nakanishi | H10K 50/858 313/506 |
| 2006/0262250 A1 | 11/2006 | Hobbs | |
| 2007/0053030 A1 | 3/2007 | Hoshino et al. | |
| 2012/0127547 A1 | 5/2012 | Gocho et al. | |
| 2014/0314374 A1 | 10/2014 | Fattal et al. | |
| 2017/0307886 A1* | 10/2017 | Stenberg | G02B 5/1842 |
| 2019/0227316 A1 | 7/2019 | Lee et al. | |
| 2020/0209483 A1 | 7/2020 | Mohanty | |
| 2020/0213579 A1 | 7/2020 | Mohanty | |
| 2020/0301051 A1 | 9/2020 | Josell et al. | |
| 2022/0373725 A1 | 11/2022 | Zhang et al. | |
| 2024/0418928 A1 | 12/2024 | Traub et al. | |

OTHER PUBLICATIONS

Park S., et al., "Optimization of Saw-Tooth Surface Planarization for Ultra-Low Blaze Angle Gratings for ALS-U," SPIE Proceedings [Proceedings of SPIE ISSN 0277-786X], vol. 11491, Aug. 21, 2020, 10 pages.

Pradana A., et al., "Tailoring the Refractive Index of Nanoimprint Resist by Blending With TiO2 Nanoparticles," Optical Materials Express, Jan. 24, 2014, vol. 4, No. 2, 9 pages.

International Preliminary Report on Patentability for International Application No. PCT/US2022/029976, mailed Nov. 30, 2023, 8 pages.

Non-Final Office Action mailed Jan. 29, 2024 for U.S. Appl. No. 17/327,060, filed May 21, 2021, 10 pages.

Final Office Action mailed Jun. 12, 2024 for U.S. Appl. No. 17/327,060, filed May 21, 2021, 13 pages.

Non-Final Office Action mailed Oct. 31, 2024 for U.S. Appl. No. 17/327,060, filed May 21, 2021, 11 pages.

* cited by examiner

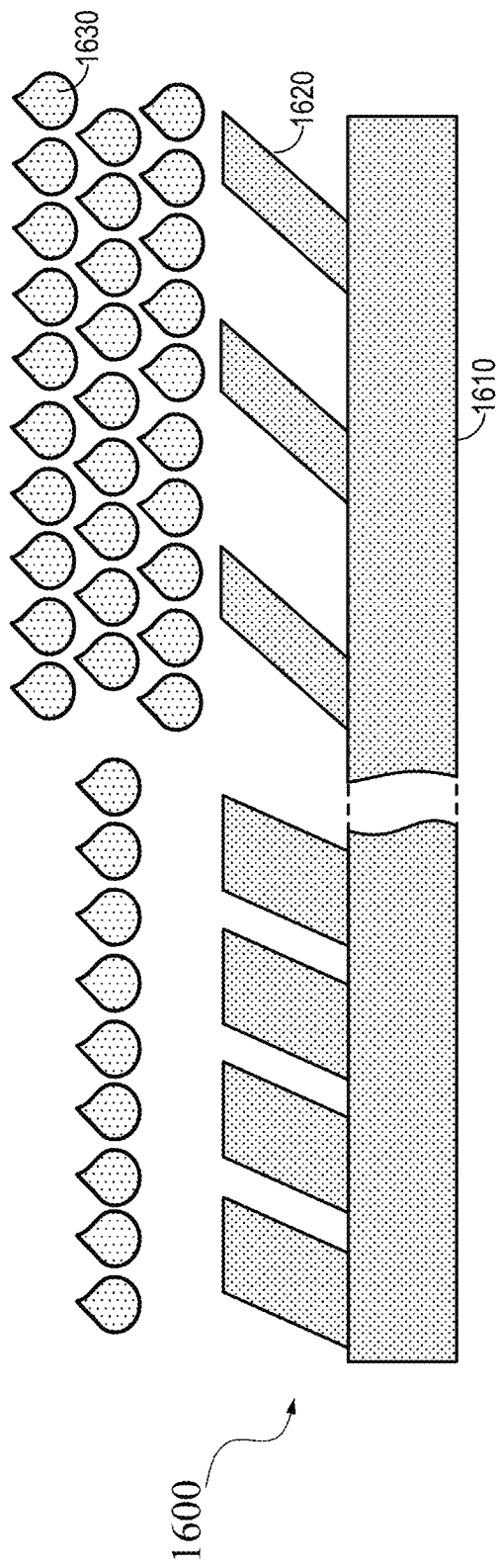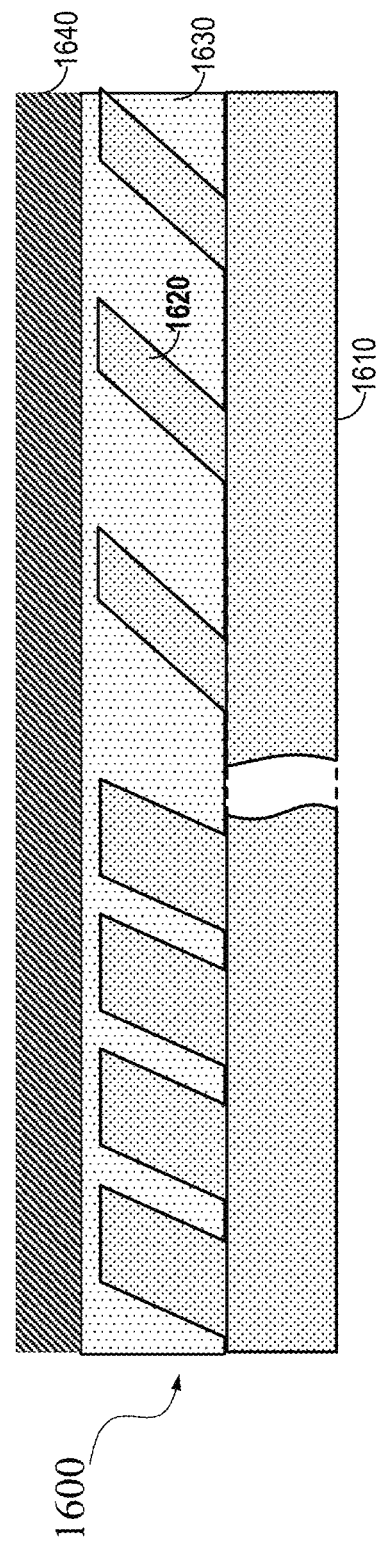
FIG. 16A
FIG. 16B

TECHNIQUES FOR CONTROLLING OVERBURDEN PLANARIZATION

CROSS-REFERENCE TO RELATED APPLICATIONS

This application claims the benefit of and priority to U.S. Provisional Application No. 63/138,084, filed Jan. 15, 2021, entitled "TECHNIQUES FOR CONTROLLING OVERBURDEN PLANARIZATION," which is herein incorporated by reference in its entirety for all purposes.

BACKGROUND

An artificial reality system, such as a head-mounted display (HMD) or heads-up display (HUD) system, generally includes a near-eye display (e.g., in the form of a headset or a pair of glasses) configured to present content to a user via an electronic or optic display within, for example, about 10-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into and/or out of the waveguide using diffractive optical elements, such as holographic gratings or surface-relief gratings. Light from the surrounding environment may pass through a see-through region of the waveguide and reach the user's eyes as well.

SUMMARY

This disclosure relates generally to surface-relief gratings. More specifically, disclosed herein are techniques for planarizing the overcoat layer on a surface-relief grating and controlling the thickness of the overcoat layer on top of the surface-relief grating. Various inventive embodiments are described herein, including devices, systems, methods, materials, processes, and the like.

According to certain embodiments, a method may include dispensing a layer of a resin material that is curable by heat or electromagnetic radiation on a surface-relief grating that includes a plurality of grating grooves, pressing the layer of the resin material using a planar imprint stamp such that the plurality of grating grooves is filled with the resin material and a top surface of the layer of the resin material contacting the planar imprint stamp is flat, curing the layer of the resin material using heat or electromagnetic radiation (e.g., ultraviolet light), and detaching the planar imprint stamp from the layer of the resin material.

In some embodiments, the resin material may include a base resin, nanoparticles, and a solvent. In some embodiments, the method may also include, before the pressing, baking the resin material to remove the solvent. In some embodiments, the base resin may include at least one actinic light curable moiety chosen from acrylate, epoxide, vinyl, thiols, allyls, vinylether, allylethers, epoxyacrylates, urethane acrylates, and polyester acrylates. In some embodiments, the base resin may include monomers, oligomers, or polymers of one or more derivatives of bisfluorene, dithiolane, thianthrene, biphenol, o-phenylphenol, phenoxy benzyl, bisphenol A, bisphenol F, benzyl, a phenol, or any combination thereof. In some embodiments, the base resin may include a light-sensitive base resin, the light-sensitive base resin may include a crosslinking group, and the crosslinking group may include an ethylenically unsaturated group or an oxirane ring. The nanoparticles may include at least one of titanium oxide, zirconium oxide, hafnium oxide, tungsten oxide, zinc tellurium, gallium phosphide, a derivative of any of the preceding materials, or a combination thereof. In some embodiments, the base resin may include at least one of a photo radical generator or a photo acid generator. In some embodiments, the base resin comprises acrylate monomers, a acrylate crosslinker, a surface cure modifier, a fluorinated additive, and a photo-initiator. In some embodiments, the solvent comprises propylene glycol methyl ether acetate (PGMEA) or dipropylene glycol methyl ether.

In some embodiments, the resin material may be flowable at room temperature before the curing. In some embodiments, curing the resin material comprises curing the resin material using ultraviolet light. The planar imprint stamp may be transparent to ultraviolet light. In some examples, dispensing the layer of the resin material on the surface-relief grating may include spin-coating the layer of the resin material on the surface-relief grating, or dispensing a plurality of drops of the resin material on the surface-relief grating. In some embodiments, the plurality of grating grooves may be characterized by at least one of a non-uniform depth, a non-uniform pitch, a non-uniform width, or a non-uniform slant angle, where dispensing the layer of the resin material on the surface-relief grating may include dispensing different amounts of the resin material on two or more different regions the surface-relief grating.

In some embodiments, the planar imprint stamp may be characterized by a peak-to-valley height of a surface that contacts the layer of the resin material less than 5 nm. In some embodiments, after curing, the resin material may be characterized by a refractive index between about 1.45 and about 3.4. In some embodiments, after detaching the planar imprint stamp from the layer of the resin material, a thickness of the layer of the resin material on top of grating ridges of the surface-relief grating may be equal to or less than about 20 nm.

According to certain embodiments, an optical device may include a surface-relief grating including a plurality of ridges and a plurality of grooves, and an overcoat layer filled in the plurality of grooves and on top of the plurality of ridges. The plurality of grooves may be characterized by a depth greater than about 50 nm, such as about 100 nm or a few hundred nanometers. The overcoat layer may include an organic material. A thickness of the overcoat layer on top of the plurality of ridges may be equal to or less than about 20 nm. A surface peak-to-valley height of a top surface of the overcoat layer may be equal to or less than about 5 nm.

In some embodiments, the overcoat layer may be characterized by a refractive index between about 1.45 and about 3.4. In some embodiments, the overcoat layer may include a resin and nanoparticles dispersed in the resin. The nanoparticles may include titanium oxide, zirconium oxide, hafnium oxide, tungsten oxide, zinc tellurium, gallium phosphide, a derivative of any of the preceding materials, or any combination of the preceding materials. In some embodiments, the plurality of grooves may be characterized by at least one of a non-uniform depth, a non-uniform pitch, a non-uniform width, or a non-uniform slant angle.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 9A shows a master mold. FIG. 9B illustrates the master mold coated with a soft stamp material layer. FIG. 9C illustrates a lamination process for laminating a soft stamp foil onto the soft stamp material layer. FIG. 9D illustrates a delamination process, where the soft stamp including the soft stamp foil and the attached soft stamp material layer is detached from the master mold.

FIG. 10A shows a waveguide coated with an imprint resin layer. FIG. 10B shows the lamination of the soft stamp onto the imprint resin layer. FIG. 10C shows the delamination of the soft stamp from the imprint resin layer. FIG. 10D shows an example of an imprinted slanted grating formed on the waveguide.

FIGS. 16A and 16B illustrate an example of a method of forming a planarized overcoat layer on a surface-relief grating using inkjet printing and imprinting techniques according to certain embodiments.

Figure 1:
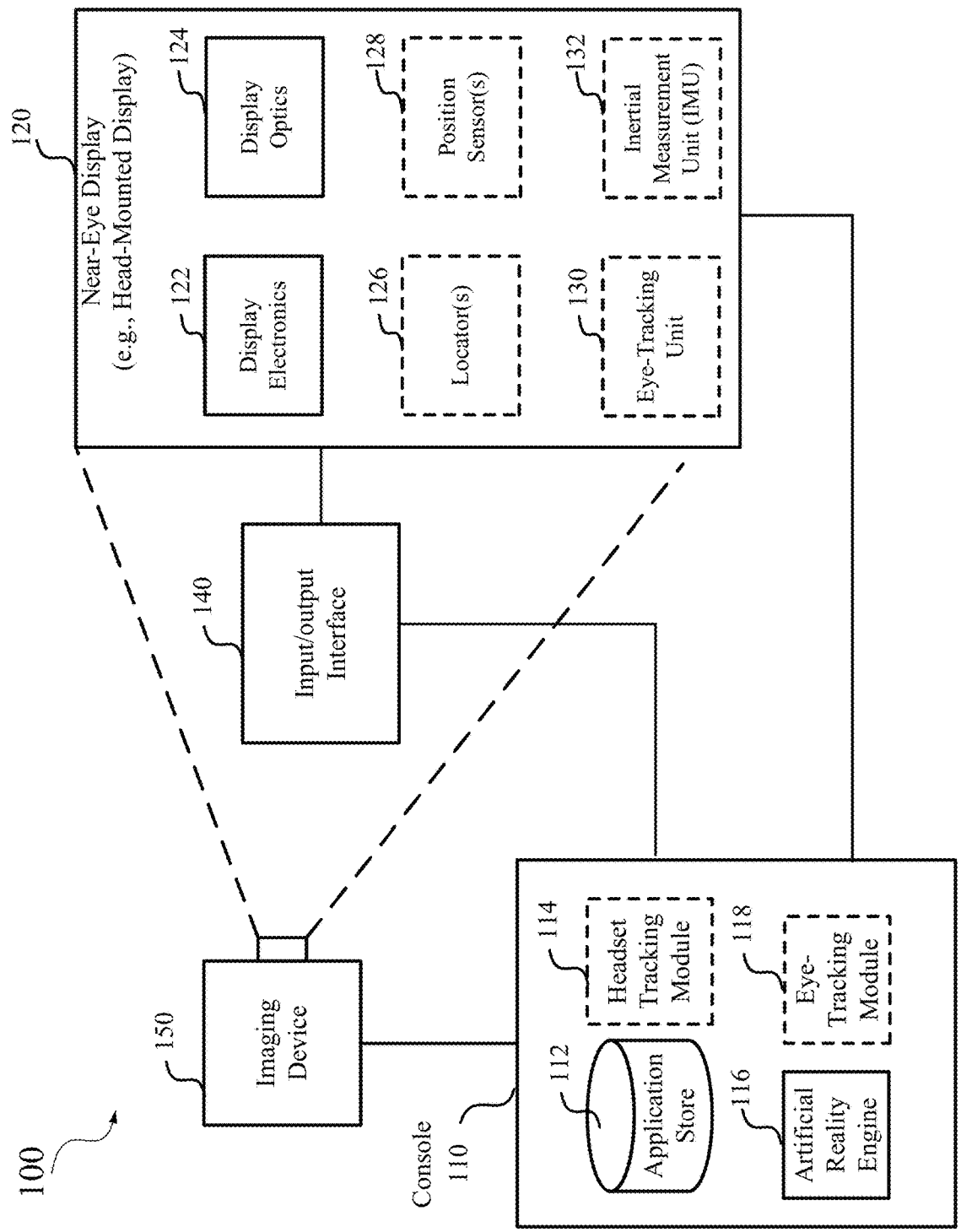
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to surface-relief gratings. More specifically, disclosed herein are techniques for planarizing the overcoat layer on a surface-relief grating and controlling the thickness of the overcoat layer on top of the surface-relief grating. Various inventive embodiments are described herein, including devices, systems, methods, materials, processes, and the like.

Surface-relief structures, such as slanted surface-relief gratings, may be used in some optical devices to manipulate behavior of light. For example, slanted surface-relief gratings may be used in near-eye display systems to couple display light into or out of a waveguide. An overcoat layer having a refractive index different from that of the grating ridges may be formed on the slanted surface-relief gratings to fill the grating grooves and protect the slanted structures. The overcoat layer may be formed on surface-relief gratings by spin-on techniques or other deposition techniques. Spin-on techniques may offer a relatively low-cost and simple solution, but the top surface of the overcoat layer may not be even because the spin-on material may follow the topography of the underlying surface-relief grating, which may have varying thicknesses, slant angles, duty cycles, depths, and the like. For example, the top surface of the overcoat layer at the grating grooves may be lower than the top surface of the overcoat layer on the grating ridges. The uneven surface of the overcoat layer may degrade the performance of the surface-relief grating, such as causing stray light, reducing the coupling efficiency, increasing display leakage, and the like.

In addition, overcoat layers formed using techniques such as the spin-on techniques may not have precisely controlled thicknesses. In many artificial reality applications, it may be desirable to precisely control the thickness and the surface roughness of the overcoat layer to improve the performance of the surface-relief grating and the display system. For example, it may be desirable that the thickness of the overburden of the overcoat layer (e.g., the portion of the overcoat layer on top of the grating ridges) is less than about 20 nm, and the surface peak-to-valley height is less than about 5 nm. Some techniques, such as chemical mechanical polishing (CMP) techniques or etching techniques (e.g., slanted etching or gray scale etching), may be used to planarize the top surface of the overcoat layer on the surface-relief grating. However, the CMP techniques may not precisely control the thickness of the overcoat layer (the overburden) on top of the surface-relief grating. In addition, CMP may not achieve desired results (e.g., the desired surface roughness) for hybrid overcoat materials that include organic materials mixed with nanoparticles (e.g., having a linear dimension about 10 to 15 nm, which may be greater than the desired surface peak-to-valley height or surface roughness), and may increase the complexity and the cost. Etching techniques may not precisely control the thickness of the overburden either. In addition, the etching process may not properly etch hybrid overcoat materials that include organic materials mixed with nanoparticles. For example, nanoparticles and other residues may accumulate at the etched surface.

According to certain embodiments, an imprint technique may be used to form a planarized overcoat layer on a surface-relief grating, such as a slanted surface-relief grating or a surface-relief grating with grating parameters varying across the area of the surface-relief grating. In one example, an overcoat material that includes a base resin, nanoparticles, a crosslink initiator, and/or a solvent may be dispensed on the surface-relief grating by, for example, spin-coating or inkjet printing. The amount of overcoat material dispensed on the surface-relief grating may be determined based on the dimensions of the grating grooves and the desired thickness of the overburden (e.g., the portion of the overcoat layer on top of the grating ridges). For example, in some surface-relief gratings, grating parameters such as the grating period, depth, and/or duty cycle may be non-uniform across a surface-relief grating, and thus different amounts of the overcoat material may be dispensed at different regions of the surface-relief grating. After dispensing the overcoat material on the surface-relief grating, the top surface of the overcoat layer may not be flat. The dispensed overcoat material may optionally be baked to remove the solvent and/or trapped air (e.g., bubbles) in the overcoat layer. An imprint process using a planar imprint stamp or mold may then be performed to press the overcoat layer and form an overcoat layer with a flat top surface. The overcoat layer may then be cured (e.g., using UV light) to crosslink and fix the base resin in the overcoat material. After the curing, the planar imprint stamp or mold may be delaminated or otherwise detached from the overcoat layer and the surface-relief grating. According to certain embodiments, after detaching the planar imprint stamp from the layer of the overcoat material, the thickness of the overcoat layer on top of the grating ridges may be equal to or less than about 20 nm. A surface peak-to-valley height of the top surface of the overcoat layer may be equal to or less than about 5 nm.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to determine the eye's orientation more accurately.

Figure 2:
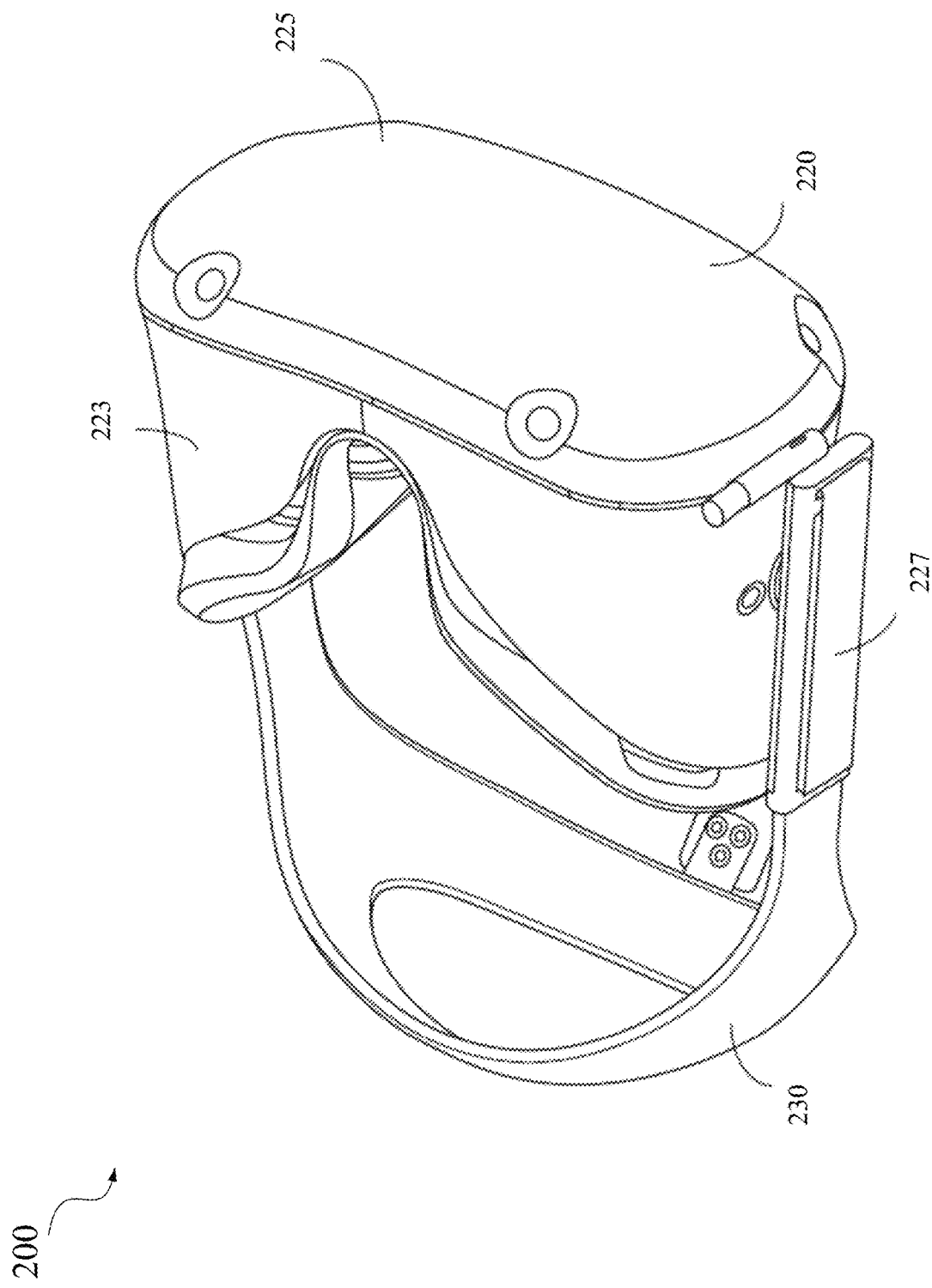
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or 3D images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMOLED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
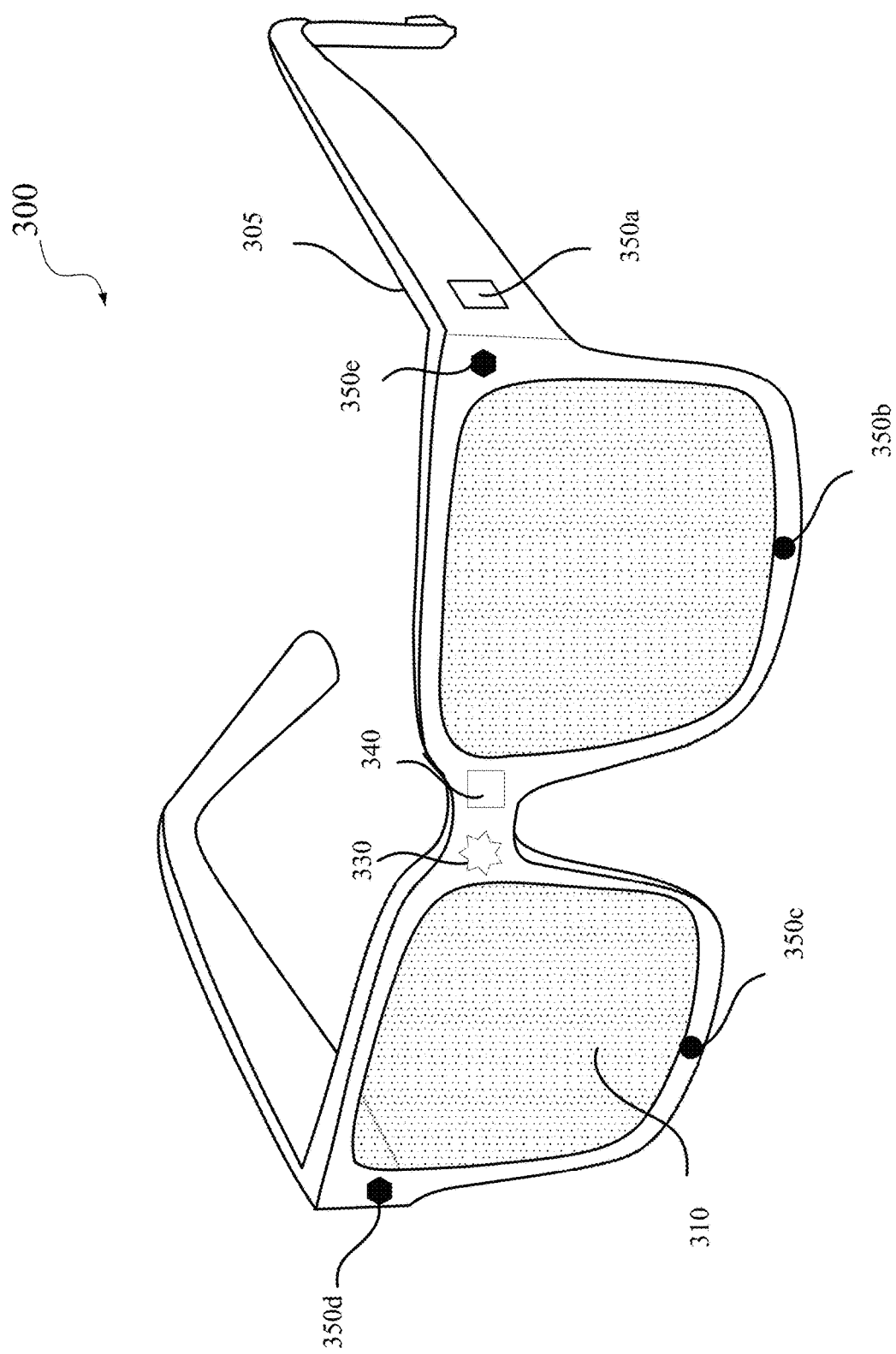
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
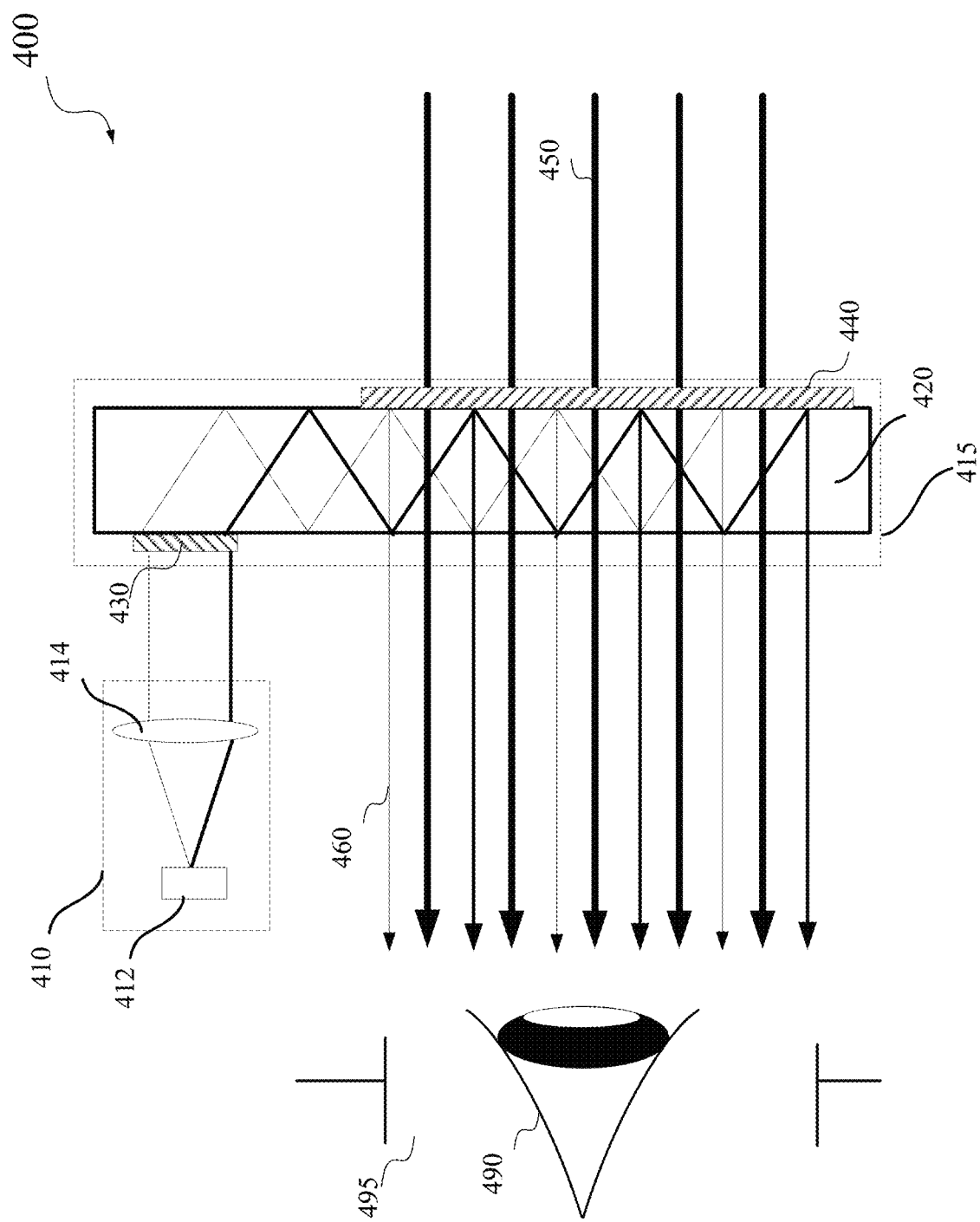
FIG. 4 illustrates an example of an optical see-through augmented reality system including a waveguide display according to certain embodiments.

FIG. 4 illustrates an example of an optical see-through augmented reality system 400 including a waveguide display according to certain embodiments. Augmented reality system 400 may include a projector 410 and a combiner 415. Projector 410 may include a light source or image source 412 and projector optics 414. In some embodiments, light source or image source 412 may include one or more micro-LED devices described above. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, and/or a micro-LED described above. In some embodiments, image source 412 may include a plurality of light sources (e.g., an array of micro-LEDs described above), each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical element (DOE) (e.g., a surface-relief grating), a slanted surface of substrate 420, or a refractive coupler (e.g., a wedge or a prism). For example, input coupler 430 may include a reflective volume Bragg grating or a transmissive volume Bragg grating. Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440, each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495 such that the displayed image is visible in a larger area. As input coupler 430, output couplers 440 may include grating couplers (e.g., volume holographic gratings or surface-relief gratings), other diffraction optical elements (DOEs), prisms, etc. For example, output couplers 440 may include reflective volume Bragg gratings or transmissive volume Bragg gratings. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 in certain desired directions (i.e., diffraction angles) with little loss. As a result, the user may be able to view combined images of the environment in front of combiner 415 and images of virtual objects projected by projector 410.

Figure 5:
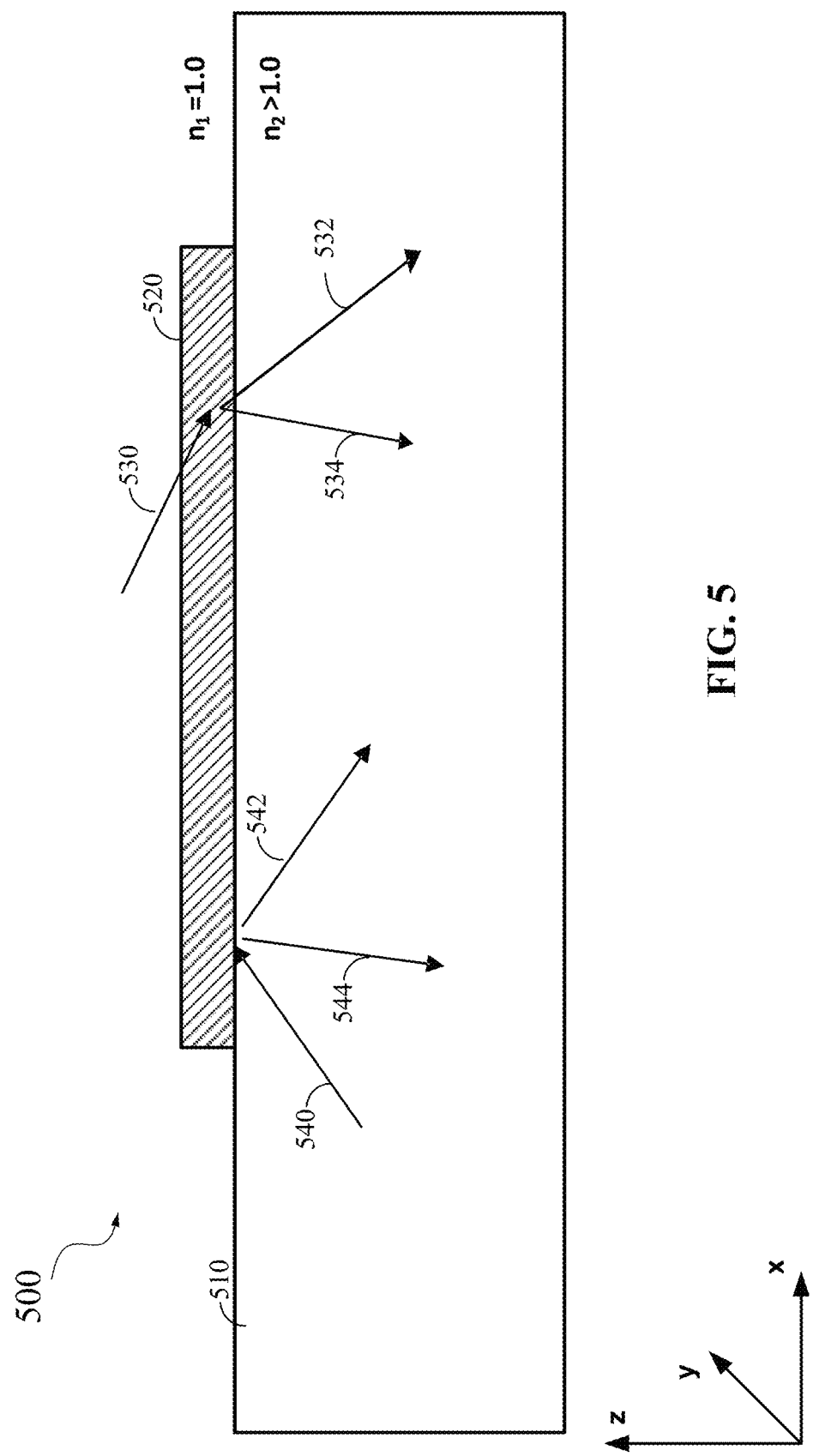
FIG. 5 illustrates examples of propagations of display light and external light in an example of a waveguide display.

FIG. 5 illustrates propagations of display light 540 and external light 530 in an example waveguide display 500 including a waveguide 510 and a grating coupler 520. Waveguide 510 may be a flat or curved transparent substrate with a refractive index $n_2$ greater than the free space refractive index $n_1$ (e.g., 1.0). Grating coupler 520 may be, for example, a Bragg grating or a surface-relief grating.

Display light 540 may be coupled into waveguide 510 by, for example, input coupler 430 of FIG. 4 or other couplers (e.g., a prism or slanted surface) described above. Display light 540 may propagate within waveguide 510 through, for example, total internal reflection. When display light 540 reaches grating coupler 520, display light 540 may be diffracted by grating coupler 520 into, for example, a $0^{th}$ order diffraction (i.e., reflection) light 542 and a −1st order diffraction light 544. The $0^{th}$ order diffraction may propagate within waveguide 510, and may be reflected by the bottom surface of waveguide 510 towards grating coupler 520 at a different location. The −1st order diffraction light 544 may be coupled (e.g., refracted) out of waveguide 510 towards the user's eye, because a total internal reflection condition may not be met at the bottom surface of waveguide 510 due to the diffraction angle.

External light 530 may also be diffracted by grating coupler 520 into, for example, a $0^{th}$ order diffraction light 532 and a −1st order diffraction light 534. Both the $0^{th}$ order diffraction light 532 and the −1st order diffraction light 534 may be refracted out of waveguide 510 towards the user's eye. Thus, grating coupler 520 may act as an input coupler for coupling external light 530 into waveguide 510, and may also act as an output coupler for coupling display light 540 out of waveguide 510. As such, grating coupler 520 may act as a combiner for combining external light 530 and display light 540. In general, the diffraction efficiency of grating coupler 520 (e.g., a surface-relief grating coupler) for external light 530 (i.e., transmissive diffraction) and the diffraction efficiency of grating coupler 520 for display light 540 (i.e., reflective diffraction) may be similar or comparable.

In order to diffract light at a desired direction towards the user's eye and to achieve a desired diffraction efficiency for certain diffraction orders, grating coupler 520 may include a blazed or slanted grating, such as a slanted Bragg grating or surface-relief grating, where the grating ridges and grooves may be tilted relative to the surface normal of grating coupler 520 or waveguide 510.

Figure 6:
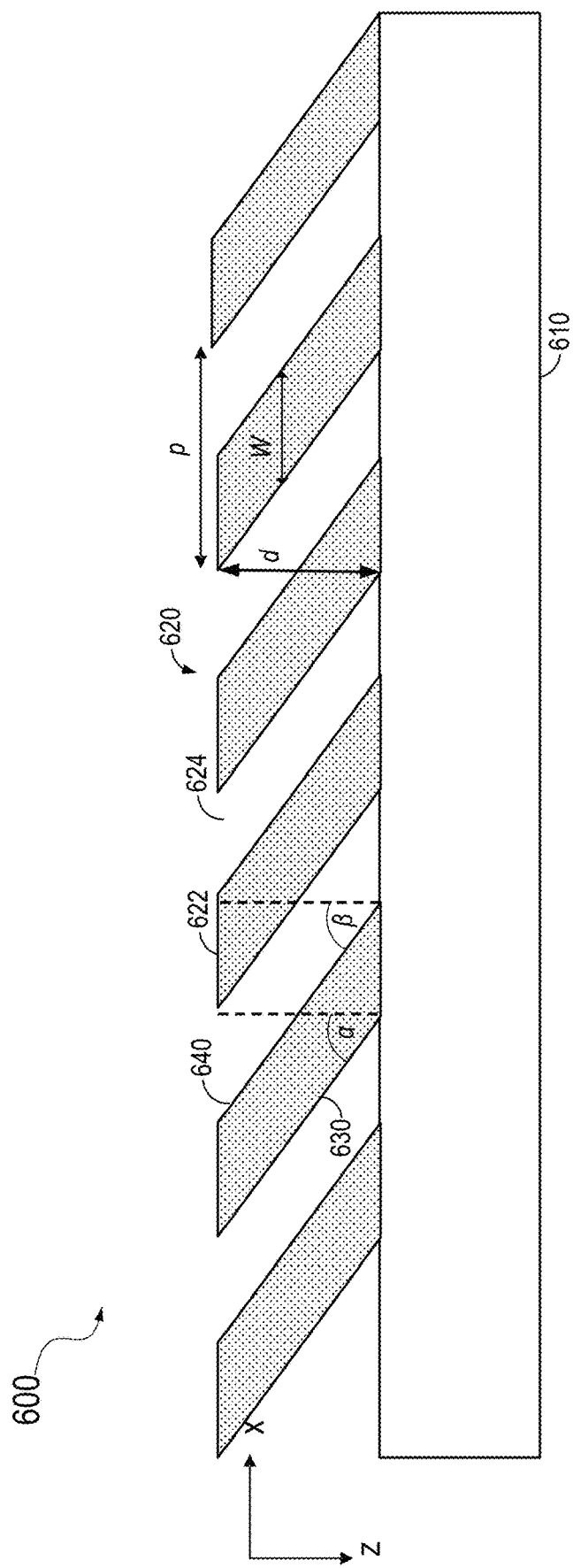
FIG. 6 illustrates an example of a slanted grating coupler in a waveguide display according to certain embodiments.

FIG. 6 illustrates an example of a slanted grating 620 in a waveguide display 600 according to certain embodiments. Slanted grating 620 may be an example of input coupler 430, output couplers 440, or grating coupler 520. Waveguide display 600 may include slanted grating 620 on a waveguide 610, such as substrate 420 or waveguide 510. Slanted grating 620 may act as a grating coupler for couple light into or out of waveguide 610. In some embodiments, slanted grating 620 may include a one-dimensional periodic structure with a period p. For example, slanted grating 620 may include a plurality of ridges 622 and grooves 624 between ridges 622. Each period of slanted grating 620 may include a ridge 622 and a groove 624, which may be an air gap or a region filled with a material with a refractive index $n_{g2}$. The ratio between the width d of a ridge 622 and the grating period p may be referred to as duty cycle. Slanted grating 620 may have a duty cycle ranging, for example, from about 10% to about 90% or greater. In some embodiments, the duty cycle may vary from period to period. In some embodiments, the period p of the slanted grating may vary from one area to another on slanted grating 620, or may vary from one period to another (i.e., chirped) on slanted grating 620.

Ridges 622 may be made of a material with a refractive index of $n_{g1}$, such as silicon containing materials (e.g., $SiO_2$, $Si_3N_4$, SiC, $SiO_xN_y$, or amorphous silicon), organic materials (e.g., spin on carbon (SOC) or amorphous carbon layer (ACL) or diamond like carbon (DLC)), or inorganic metal oxide layers (e.g., $TiO_x$, $AlO_x$, $TaO_x$, $HfO_x$, etc.). Each ridge 622 may include a leading edge 630 with a slant angel α and a trailing edge 640 with a slant angle β. In some embodiments, leading edge 630 and training edge 640 of each ridge 622 may be parallel to each other. In other words, slant angle α is approximately equal to slant angle β. In some embodiments, slant angle α may be different from slant angle β. In some embodiments, slant angle α may be approximately equal to slant angle β. For example, the difference between slant angle α and slant angle θ may be less than 20%, 10%, 5%, 1%, or less. In some embodiments, slant angle α and slant angle θ may range from, for example, about 30° or less to about 70% or larger.

In some implementations, grooves 624 between the ridges 622 may be over-coated or filled with a material having a refractive index $n_{g2}$ higher or lower than the refractive index of the material of ridges 622. For example, in some embodiments, a high refractive index material, such as Hafnia, Titania, Tantalum oxide, Tungsten oxide, Zirconium oxide, Gallium sulfide, Gallium nitride, Gallium phosphide, silicon, and a high refractive index polymer, may be used to fill grooves 624. In some embodiments, a low refractive index material, such as silicon oxide, alumina, porous silica, or fluorinated low index monomer (or polymer), may be used to fill grooves 624. As a result, the difference between the refractive index of the ridges and the refractive index of the grooves may be greater than 0.1, 0.2, 0.3, 0.5, 1.0, or higher.

The user experience with an artificial reality system may depend on several optical characteristics of the artificial reality system, such as the field of view (FOV), image quality (e.g., resolution), size of the eye box of the system (to accommodate for eye and/or head movement), the distance of eye relief, optical bandwidth, and brightness of the displayed image. In general, the FOV and the eye box need to be as large as possible, the optical bandwidth needs to cover the visible band, and the brightness of the displayed image needs to be high enough (especially for optical see-through AR systems).

In a waveguide-based near-eye display, the output area of the display may be much larger than the size of the eyebox of the near-eye display system. The portion of light that may reach a user's eyes may depend on the ratio between the size of the eyebox and the output area of the display, which, in some cases, may be less than 10% for a certain eye relief and field of view. In order to achieve a desired brightness of the displayed image perceived by user's eyes, the display light from the projector or the light source may need to be increased significantly, which may increase the power consumption and cause some safety concerns.

Figure 7B:
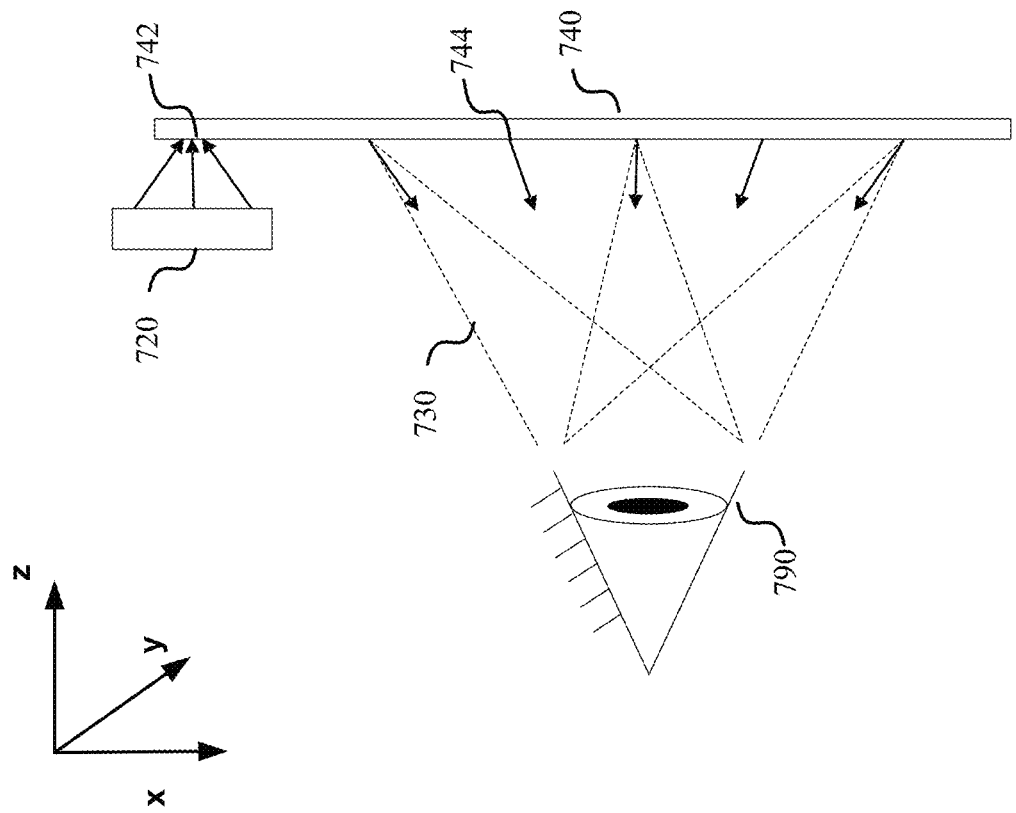
FIG. 7B illustrates an example of a waveguide-based near-eye display where display light may be coupled out of a waveguide display at different angles in different regions of the waveguide display according to certain embodiments.
Figure 7A:
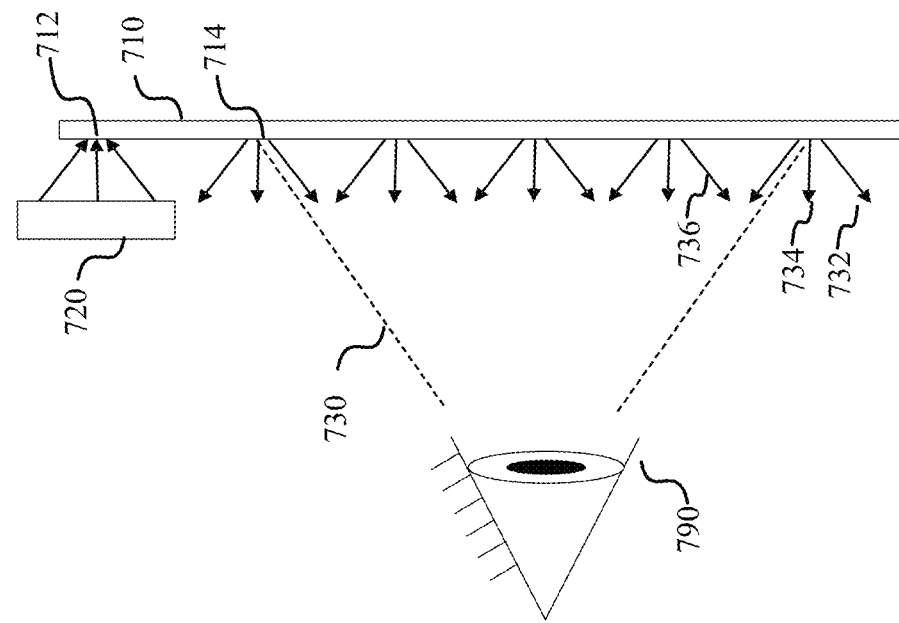
FIG. 7A illustrates an example of a waveguide-based near-eye display where display light for all fields of view is substantially uniformly output from different regions of a waveguide display.

FIG. 7A illustrates an example of a waveguide-based near-eye display where display light for all fields of view may be substantially uniformly output from different regions of a waveguide display 710. The near-eye display may include a projector 720 and waveguide display 710. Projector 720 may be similar to projector 410 and may include a light source or image source similar to light source or image source 412 and projector optics similar to projector optics 414. Waveguide display 710 may include a waveguide (e.g., a substrate), one or more input couplers 712, and one or more output couplers 714. Input couplers 712 may be configured to couple display light from different fields of view (or viewing angles) into the waveguide, and output couplers 714 may be configured to couple display light out of the waveguide. The input and output couplers may include, for example, slanted surface-relief gratings or volume Bragg gratings. In the example shown in FIG. 7, output coupler 714 may have similar grating parameters across the full region of the output coupler other than parameters that may be varied to adjust the coupling efficiency for more uniform output light. Thus, the display light may be partially coupled out of the waveguide at different regions of waveguide display 710 in a similar manner as shown in FIG. 7A, where display light from all fields of view of the near-eye display may be partially coupled out of the waveguide at any given region of waveguide display 710.

As also shown in FIG. 7A, the near-eye display system may have an eyebox at a certain eyebox position 790 and having a limited size and thus a limited field of view 730. As such, not all light coupled out of the waveguide in waveguide display 710 may reach the eyebox at eyebox position 790. For example, display light 732, 734, and 736 from waveguide display 710 may not reach the eyebox at eyebox position 790, and thus may not be received by the user's eyes, which may result in significant loss of the optical power from projector 720.

In certain embodiments, an optical coupler (e.g., a slanted surface-relief grating) for a waveguide-based display may include a grating coupler that includes multiple regions (or multiple multiplexed grating), where different regions of the grating coupler may have different angular selectivity characteristics (e.g., constructive interference conditions) for the incident display light such that, at any region of the waveguide-based display, diffraction light that would not eventually reach user's eyes may be suppressed (i.e., may not be diffracted by the grating coupler so as to be coupled into or out of the waveguide and thus may continue to propagate within the waveguide), while light that may eventually reach the user's eyes may be diffracted by the grating coupler and be coupled into or out of the waveguide.

FIG. 7B illustrates an example of a waveguide-based near-eye display where display light may be coupled out of a waveguide display 740 at different angles in different regions of the waveguide display according to certain embodiments. Waveguide display 740 may include a waveguide (e.g., a substrate), one or more input couplers 742, and one or more output couplers 744. Input couplers 742 may be configured to couple display light from different fields of view (e.g., viewing angles) into the waveguide, and output couplers 744 may be configured to couple display light out of the waveguide. The input and output couplers may include, for example, slanted surface-relief gratings or other types of gratings or reflectors. The output couplers may have different grating parameters and thus different angular selectivity characteristics at different regions of the output couplers. Thus, at each region of the output couplers, only display light that would propagate in a certain angular range towards the eyebox at position 790 of the near-eye display may be coupled out of the waveguide, while other display light may not meet the angular selectivity condition at the region and thus may not be coupled out of the waveguide. In some embodiments, the input couplers may also have different grating parameters and thus different angular selectivity characteristics at different regions of the input couplers, and thus, at each region of an input coupler, only display light from a respective field of view may be coupled into the waveguide. As a result, most of the display light coupled into the waveguide and propagating in the waveguide can be efficiently sent to the eyebox, thus improving the power efficiency of the waveguide-based near-eye display system.

The refractive index modulation of a slanted surface-relief grating, and other parameters of the slanted surface-relief grating, such as the grating period, the slant angle, the duty cycle, the depth, and the like, may be configured to selectively diffract incident light within a certain incident angular range (e.g., FOV) and/or a certain wavelength band at certain diffraction directions (e.g., within an angular range shown by field of view 730). For example, when the refractive index modulation is large (e.g., >0.2), a large angular bandwidth (e.g., >) 10° may be achieved at the output couplers to provide a sufficiently large eyebox for the waveguide-based near-eye display system.

Figure 8A:
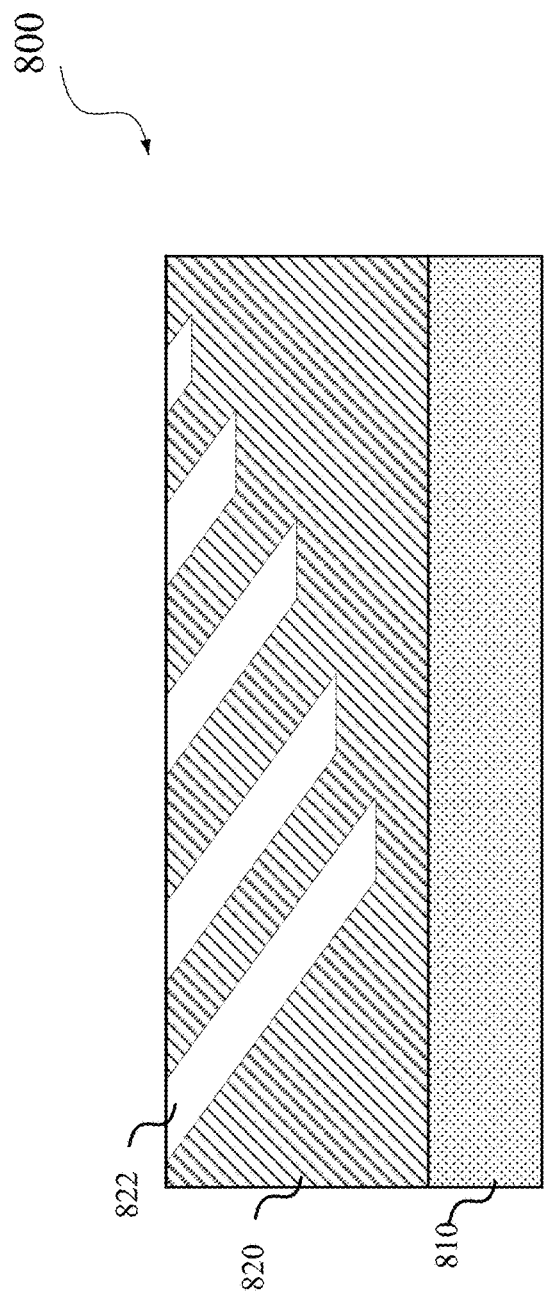
FIG. 8A illustrates an example of a slanted surface-relief grating with variable etch depths according to certain embodiments.

FIG. 8A shows a cross-sectional image of an example of a slanted grating 800 with variable etch depths according to certain embodiments. In the illustrated example, slanted grating 800 may include a substrate 810 (e.g., a glass or SiC substrate) and a grating layer 820 (e.g., a dielectric or polymer layer, which may or may not include the same material as substrate 810) on substrate 810. A plurality of grating grooves 822 may be etched or otherwise formed (e.g., imprinted) in grating layer 820. Grating grooves 822 may have non-uniform depths, widths, and/or separations. As such, slanted grating 800 may have variable grating periods, depths, and/or duty cycles.

Figure 8B:
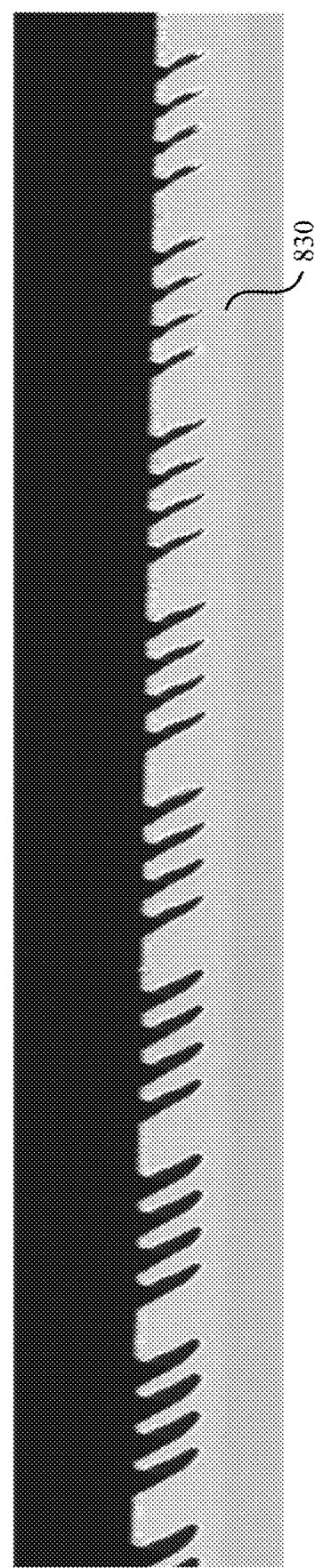
FIG. 8B illustrates an example of a slanted surface-relief grating with variable etch depths and variable duty cycles according to certain embodiments.

FIG. 8B shows a cross-sectional view of an example of a slanted grating 805 with variable etch depths and duty cycles according to certain embodiments. In the example shown in FIG. 8B, slanted grating 805 may be etched in a dielectric layer 830, which may have a refractive index, for example, between about 1.46 and about 2.4. As illustrated, slanted grating 805 may have different etch depths and duty cycles at different regions. The grating period may also be different at the different regions. As such, different regions of slanted grating 805 may have different diffraction characteristics as described above with respect to, for example, FIG. 7B.

The slanted surface-relief gratings with parameters and configurations (e.g., duty cycles, depths, or refractive index modulations) varying over the regions of the gratings described above and other surface-relief gratings (e.g., gratings used for eye-tracking) may be fabricated using many different nanofabrication techniques. The nanofabrication techniques generally include a patterning process and a post-patterning (e.g., over-coating) process. The patterning process may be used to form slanted ridges or grooves of the slanted grating. There may be many different nanofabrication techniques for forming the slanted ridges. For example, in some implementations, the slanted grating may be fabricated using lithography techniques that include slanted etching. In some implementations, the slanted grating may be fabricated using nanoimprint lithography (NIL) molding techniques, where a master mold including slanted structures may be fabricated using, for example, slanted etching techniques, and may then be used to mold slanted gratings or different generations of soft stamps for imprinting slanted gratings. The post-patterning process may be used to overcoat the slanted ridges and/or to fill the gaps between the slanted ridges with a material having a different refractive index than the slanted ridges. The post-patterning process (e.g., overcoating and planarization) may be independent from the patterning process. Thus, a same post-patterning process may be performed on slanted gratings fabricated using any patterning technique.

In a NIL molding process, a substrate (e.g., a waveguide) may be coated with a NIL resin layer. The ML resin layer may include, for example, a butyl-acrylate-based resin doped with a sol-gel precursor (e.g., titanium butoxide), a monomer containing a reactive functional group for subsequent infusion processes (such as acrylic acid), and/or high refractive index nanoparticles (e.g., titanium oxide, zirconium oxide, hafnium oxide, tungsten oxide, zinc tellurium, or gallium phosphide). In some embodiments, the ML resin layer may include polydimethylsiloxane (PDMS) or another silicone elastomer or silicon-based organic polymer. The ML resin layer may be deposited on the substrate by, for example, spin-coating, lamination, or inkjet printing. A ML mold with a nanostructure formed thereon may be pressed against the ML resin layer and the substrate for molding a nanostructure in the ML resin layer. The ML resin layer may be cured subsequently (e.g., crosslinked) using heat and/or ultraviolet (UV) light. After the curing, the NIL mold may be detached from the ML resin layer and the substrate. After the ML mold is detached from the ML resin layer and the substrate, a nanostructure (e.g., a slanted grating) that is complementary to the nanostructure in the ML mold may be formed in the ML resin layer on the substrate.

In some embodiments, a master ML mold (e.g., a hard mold including a rigid material, such as Si, $SiO_2$, $Si_3N_4$, or a metal) may be fabricated first using, for example, slanted etching, micromachining, or 3-D printing. A soft stamp may be fabricated using the master ML mold, and the soft stamp may then be used as the working stamp to fabricate the slanted grating or may be used to fabricate a next generation soft stamp. In such a process, the slanted grating structure in the master ML mold may be similar to the slanted grating of the grating coupler for the waveguide display, and the slanted grating structure on the soft stamp may be complementary to the slanted grating structure in the master ML mold and the slanted grating of the grating coupler for the waveguide display. Compared with a hard stamp or hard mold, a soft stamp may offer more flexibility during the molding and demolding processes.

Figure 9A:
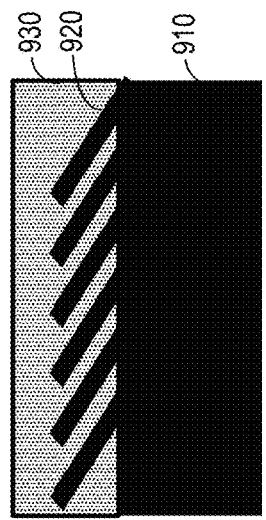
FIGS. 9A-9D illustrate an example of a process for fabricating a soft stamp for nanoimprinting according to certain embodiments.

FIGS. 9A-9D illustrate an example of a process 900 for fabricating a soft stamp for nanoimprinting according to certain embodiments. FIG. 9A shows a master mold 910 (e.g., a hard mold or hard stamp). Master mold 910 may include a rigid material, such as a semiconductor substrate (e.g., Si or GaAs), an oxide (e.g., $SiO_2$, $Si_3N_4$, $TiO_x$, $AlO_x$, $TaO_x$, or $HfO_x$), or a metal plate. Master mold 910 may be fabricated using, for example, a slanted etching process using reactive ion beams or chemically assisted reactive ion beams, a micromachining process, or a 3-D printing process. As shown in FIG. 9A, master mold 910 may include a slanted grating 920 that may in turn include a plurality of slanted ridges 922 with gaps 924 (referred to as grooves) between slanted ridges 922.

Figure 9B:
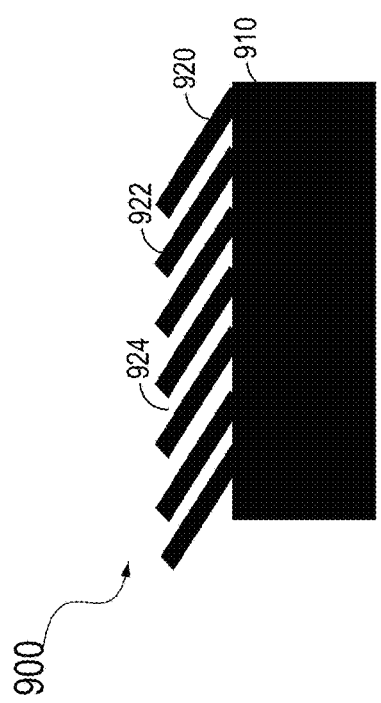

FIG. 9B illustrates master mold 910 coated with a soft stamp material layer 930. Soft stamp material layer 930 may include, for example, a resin material or a curable polymer material. In some embodiments, soft stamp material layer 930 may include polydimethylsiloxane (PDMS) or another silicone elastomer, or a silicon-based organic polymer. In some embodiments, soft stamp material layer 930 may include ethylene tetrafluoroethylene (ETFE), perfluoropolyether (PFPE), or other fluorinated polymer materials. In some embodiments, soft stamp material layer 930 may be coated on master mold 910 by, for example, spin-coating or inkjet printing.

Figure 9C:
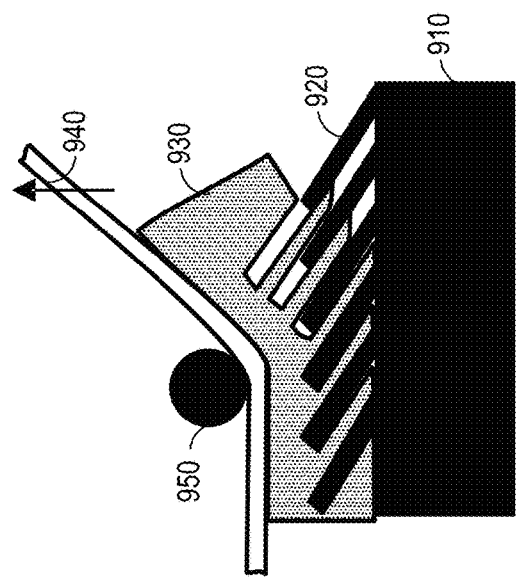

FIG. 9C illustrates a lamination process for laminating a soft stamp foil 940 onto soft stamp material layer 930. A roller 950 may be used to press soft stamp foil 940 against soft stamp material layer 930. The lamination process may also be a planarization process to make the thickness of soft stamp material layer 930 substantially uniform. After the lamination process, soft stamp foil 940 may be tightly or securely attached to soft stamp material layer 930.

Figure 9D:
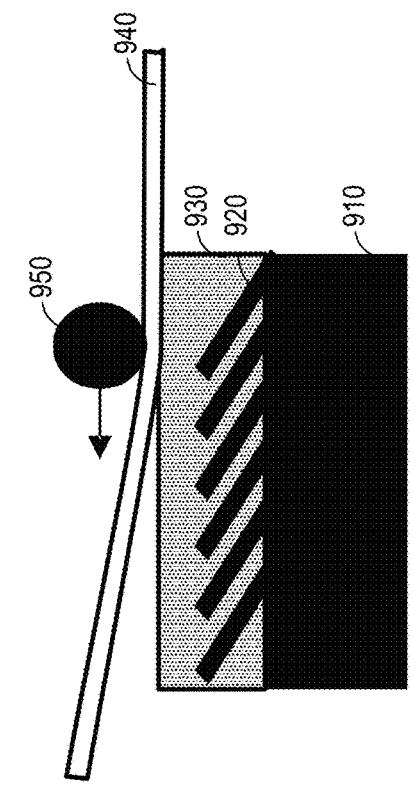

FIG. 9D illustrates a delamination process, where a soft stamp including soft stamp foil 940 and attached soft stamp material layer 930 is detached from master mold 910. Soft stamp material layer 930 may include a slanted grating structure that is complementary to the slanted grating structure on master mold 910. Because the flexibility of soft stamp foil 940 and attached soft stamp material layer 930, the delamination process may be relatively easy compared with a demolding process using a hard stamp or mold. In some embodiments, a roller (e.g., roller 950) may be used in the delamination process to ensure a constant or controlled delamination speed. In some embodiments, roller 950 may not be used during the delamination. In some implementations, an anti-sticking layer may be formed on master mold 910 before soft stamp material layer 930 is coated on master mold 910. The anti-sticking layer may facilitate the delamination process. After the delamination of the soft stamp from master mold 910, the soft stamp may be used to mold the slanted grating on a waveguide of a waveguide display.

Figure 10A:
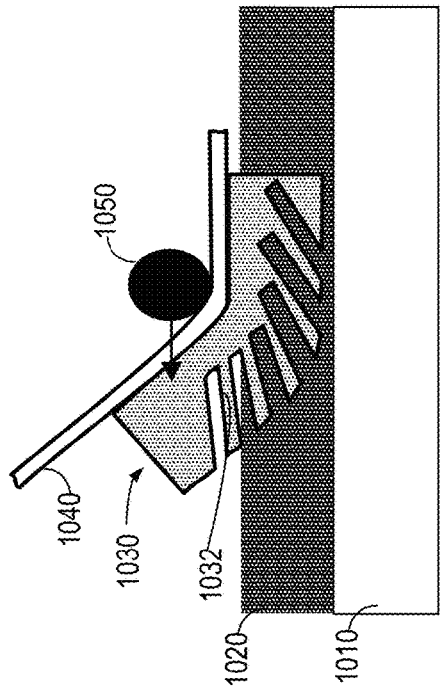
FIGS. 10A-10D illustrate an example of an imprinting process using a soft stamp according to certain embodiments.

FIGS. 10A-10D illustrate an example of an imprinting process 1000 using a soft stamp according to certain embodiments. FIG. 10A shows a waveguide 1010 coated with an imprint resin layer 1020. Imprint resin layer 1020 may include, for example, a butyl-acrylate based resin doped with a sol-gel precursor (e.g., titanium butoxide), a monomer containing a reactive functional group for subsequent infusion processes (such as acrylic acid), and/or high refractive index nanoparticles (e.g., $TiO_2$, $ZrO_2$, GaP, $HfO_2$, $WO_3$, GaAs, etc.). In some embodiments, imprint resin layer 1020 may include polydimethylsiloxane (PDMS) or another silicone elastomer, or silicon-based organic polymer. In some embodiments, imprint resin layer 1020 may include ethylene tetrafluoroethylene (ETFE), perfluoropolyether (PFPE), or other fluorinated polymer materials. Imprint resin layer 1020 may be deposited on waveguide 1010 by, for example, spin-coating, lamination, or inkjet printing. A soft stamp 1030 including slanted ridges 1032 attached to a soft stamp foil 1040 may be used for the imprint.

Figure 10B:
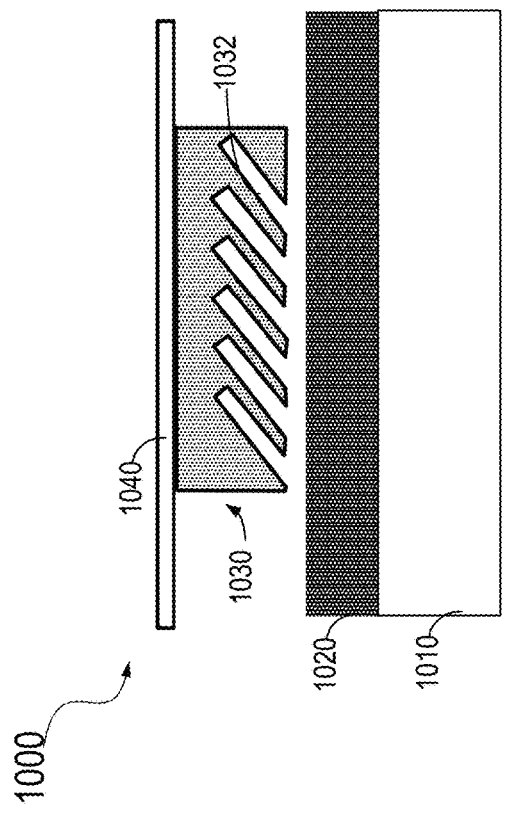

FIG. 10B shows the lamination of soft stamp 1030 onto imprint resin layer 1020. Soft stamp 1030 may be pressed against imprint resin layer 1020 and waveguide 1010 using a roller 1050, such that slanted ridges 1032 may be pressed into imprint resin layer 1020. Imprint resin layer 1020 may be cured subsequently. For example, imprint resin layer 1020 may be crosslinked using heat and/or ultraviolet (UV) light.

Figure 10C:
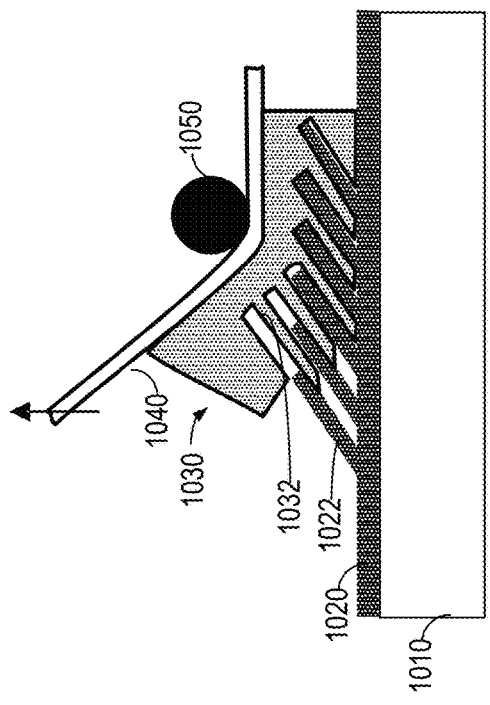

FIG. 10C shows the delamination of soft stamp 1030 from imprint resin layer 1020. The delamination may be performed by lifting soft stamp foil 1040 to detach slanted ridges 1032 of soft stamp 1030 from imprint resin layer 1020. Imprint resin layer 1020 may now include a slanted grating 1022, which may be used as the grating coupler or may be over-coated to form the grating coupler for the waveguide display. As described above, because of the flexibility of soft stamp 1030, the delamination process may be relatively easy compared with a demolding process using a hard stamp or mold. In some embodiments, a roller (e.g., roller 1050) may be used in the delamination process to ensure a constant or controlled delamination speed. In some embodiments, roller 1050 may not be used during the delamination.

Figure 10D:
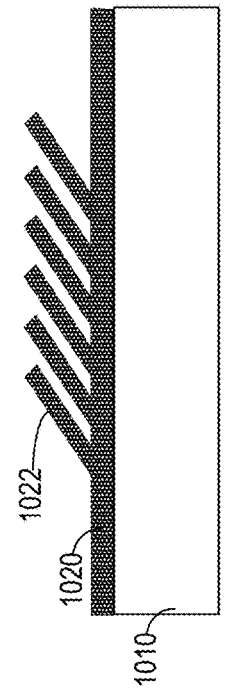

FIG. 10D shows an example imprinted slanted grating 1022 formed on waveguide 1010 using soft stamp 1030. As described above, slanted grating 1022 may include ridges and grooves between the ridges and thus may be over-coated with a material having a refractive index different from imprint resin layer 1020 to fill the grooves and form the grating coupler for the waveguide display.

The period of the slanted grating may vary from one area to another on slanted grating 1022, or may vary from one period to another (i.e., chirped) on slanted grating 1022. Slanted grating 1022 may have a duty cycle ranging, for example, from about 10% to about 90% or greater. In some embodiments, the duty cycle may vary from period to period. In some embodiments, the depth of the grooves or height of the ridges of slanted grating 1022 may be greater than about 50 nm, about 100 nm, about 200 nm, about 300 nm, about 400 nm, or higher. The slant angles of the leading edges of the ridges of slanted grating 1022 and the slant angles of the trailing edges of the ridges of slanted grating 1022 may be greater than about 30°, about 45°, about 60°, or higher. In some embodiments, the leading edge and training edge of each ridge of slanted grating 1022 may be parallel to each other. In some embodiments, the difference between the slant angle of the leading edge of a ridge of slanted grating 1022 and the slant angle of the trailing edge of the ridge of slanted grating 1022 may be less than about 20%, about 10%, about 5%, about 1%, or less.

Different generations of NIL stamps may be made and used as the working stamp to mold the slanted gratings. For example, in some embodiments, a master mold (which may be referred to as a generation 0 mold) may be fabricated (e.g., etched) in, for example, a semiconductor substrate, a quartz, or a metal plate. The master mold may be a hard stamp and may be used as the working stamp to mold the slanted grating directly, which may be referred to as hard stamp NIL or hard ML. In such case, the slanted structure on the mold may be complimentary to the desired slanted structure of the slanted grating used as the grating coupler on a waveguide display.

In order to protect the master NIL mold, the master NIL mold may be fabricated first, and a hybrid stamp (which may be referred to as generation 1 mold or stamp) may then be fabricated using the master NIL mold. The hybrid stamp may be used as the working stamp for nanoimprinting. The hybrid stamp may include a hard stamp, a soft stamp, or a hard-soft stamp. Nanoimprinting using a soft stamp may be referred to as soft stamp ML or soft ML. In some embodiments, the hybrid mold may include a plastic backplane with soft or hard patterned polymer (e.g., having a Young's modulus about 1 GPa). In some embodiments, the hybrid mold may include a glass backplane with soft or hard patterned polymer (e.g., having a Young's modulus about 1 GPa). In some embodiments, the hybrid mold may include a glass/plastic laminated backplane with soft or hard patterned polymer. In some embodiments, a generation 2 hybrid mold may be made from the generation 1 mold, and may then be used as the working stamp for the nanoimprinting. In some embodiments, generation 3 hybrid molds, generation 4 hybrid molds, and the like, may be made and used as the working stamp. ML molding may significantly reduce the cost of making the slanted surface-relief structures because the molding process may be much faster than the etching process and no expensive reactive ion etching equipment may be needed.

Figure 11:
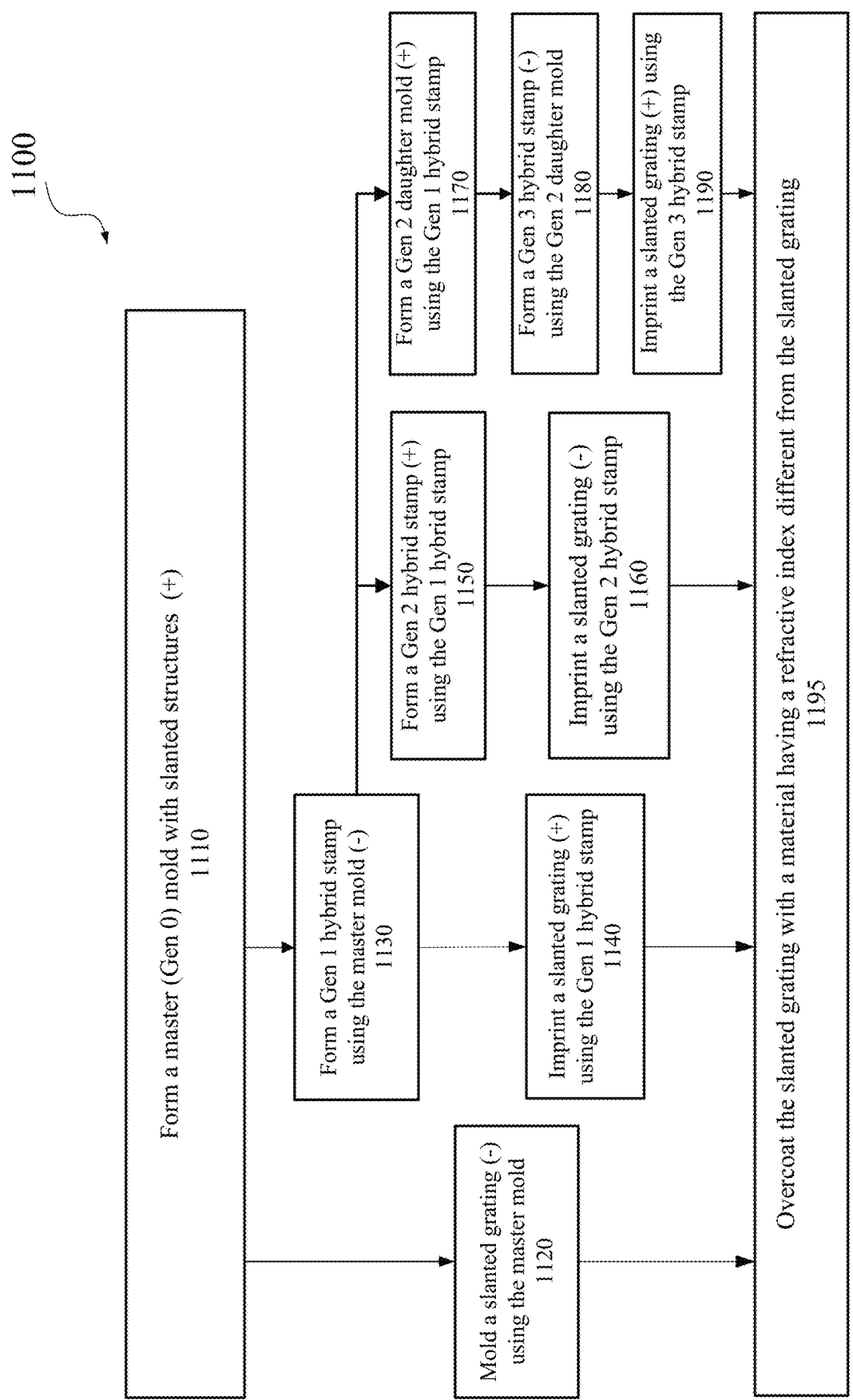
FIG. 11 is a simplified flowchart illustrating examples of methods of fabricating slanted surface-relief gratings using nanoimprint lithography according to certain embodiments.

FIG. 11 is a simplified flowchart 1100 illustrating examples of methods of fabricating slanted surface-relief gratings using nanoimprint lithography according to certain embodiments. As described above, different generations of ML stamps may be made and used as the working stamp to mold the slanted gratings. For example, in some embodiments, a master mold (i.e., generation 0 mold, which may be a hard mold) may be used as the working stamp to mold the slanted grating directly. In some embodiments, a hybrid stamp (e.g., a generation 1 hybrid mold or stamp) may be fabricated using the master mold and may be used as the working stamp for nanoimprinting. In some embodiments, a generation 2 hybrid mold (or stamp) may be made from the generation 1 mold, and may be used as the working stamp for the nanoimprinting. In some embodiments, a generation 3 mold, a generation 4 mold, and so on, may be made and used as the working stamp.

At block 1110, a master mold with a slanted structure may be fabricated using, for example, a slanted etching process that uses reactive ion beams or chemically-assisted reactive ion beams, a micromachining process, or a 3-D printing process. The master mold may be referred to as the generation 0 (or Gen 0) mold. The master mold may include quartz, fused silica, silicon, other metal-oxides, semiconductors, SiC, or plastic compounds. The slanted structure of the master mold may be referred to as having a positive (+) tone. The master mold may be used as a working stamp for molding the slanted grating directly (i.e., hard ML) at block 1120. As described above, when the master mold is used as the working stamp, the slanted structure of the master mold may be complementary to the desired slanted grating. Alternatively, the master mold may be used to make a hybrid stamp as the working stamp for molding the slanted grating. The slanted structure of the hybrid stamp may be similar to the desired slanted grating or may be complementary to the desired slanted grating, depending on the generation of the hybrid stamp used as the working stamp.

At block 1120, a slanted grating may be molded, for example, in a resin layer using the master mold as described above with respect to, for example, FIGS. 9A and 9B. The resin layer may be coated on a waveguide substrate, and may include, for example, a butyl-acrylate based resin doped with a resin comprising a sol-gel precursor (e.g., titanium butoxide), a monomer containing a reactive functional group for subsequent infusion processes (such as acrylic acid), and/or high refractive index nanoparticles (e.g., $TiO_2$, $ZrO_2$, GaP, $HfO_2$, $WO_3$, GaAs, etc.). The master mold may be pressed against the resin layer to form a slanted structure in the resin layer. The resin layer may then be cured to fix the structure formed within the resin layer by the master mold. The master mold may be detached from the resin layer to leave a slanted grating in the resin layer. The slanted grating within the resin layer may have a negative (−) tone compared with the slanted structure of the master mold.

Alternatively, at block 1130, a hybrid stamp (e.g., a hard stamp, a soft stamp, or a hard-soft stamp) with a slanted structure may be fabricated using the master mold as described above with respect to, for example, FIGS. 9A-9D. For example, the process of fabricating the hybrid stamp may include coating the master mold with a soft stamp material, such as a resin material described above. A soft stamp foil may then be laminated on the soft stamp material, for example, using a roller. The soft stamp foil and the attached soft stamp material may be securely attached to each other and may be detached from the master mold to form the soft stamp. The hybrid stamp fabricated at block 1130 may be referred to as a generation 1 (or Gen 1) stamp. The slanted grating within the Gen 1 stamp may have a negative (−) tone compared with the slanted structure of the master mold.

At block 1140, a slanted surface-relief grating may be imprinted using the Gen 1 stamp as described above with respect to, for example, FIGS. 10A-10D. For example, a waveguide substrate may be coated with an imprint resin layer. The Gen 1 stamp may be laminated on the imprint resin layer using, for example, a roller. After the imprint resin layer is cured, the Gen 1 stamp may be delaminated from the imprint resin layer to form a slanted grating within the imprint resin layer. The slanted grating within the imprint resin layer may have a positive tone.

Alternatively, in some embodiments, at block 1150, a second generation hybrid stamp (Gen 2 stamp) may be fabricated using the Gen 1 stamp using a process similar to the process for fabricating the Gen 1 stamp as described above with respect to, for example, FIGS. 9A-9D or the process described with respect to, for example, FIGS. 10A-10D. The slanted structure within the Gen 2 stamp may have a positive tone.

At block 1160, a slanted surface-relief grating may be imprinted using the Gen 2 stamp as described above with respect to, for example, FIGS. 10A-10D. For example, a waveguide substrate may be coated with an imprint resin layer. The Gen 2 stamp may be laminated on the imprint resin layer using, for example, a roller. After the imprint resin layer is cured, the Gen 2 stamp may be delaminated from the imprint resin layer to form a slanted grating within the imprint resin layer. The slanted grating within the imprint resin layer may have a negative tone.

Alternatively, in some embodiments, at block 1170, a second generation (Gen 2) daughter mold may be fabricated using the Gen 1 stamp using a process similar to the process for fabricating the Gen 1 stamp as described above with respect to, for example, FIGS. 9A-9D or the process described with respect to, for example, FIGS. 10A-10D. The slanted structure within the Gen 2 daughter mold may have a positive tone.

At block 1180, a third generation hybrid stamp (Gen 3 stamp) may be fabricated using the Gen 2 daughter mold using a process similar to the process for fabricating the Gen 1 stamp or the Gen 2 daughter mold as described above with respect to, for example, FIGS. 9A-9D or the process described with respect to, for example, FIGS. 10A-10D. The slanted structure within the Gen 3 stamp may have a negative tone.

At block 1190, a slanted surface-relief grating may be imprinted using the Gen 3 stamp as described above with respect to, for example, FIGS. 10A-10D. For example, a waveguide substrate may be coated with an imprint resin layer. The Gen 3 stamp may be laminated on the imprint resin layer using, for example, a roller. After the imprint resin layer is cured, the Gen 3 stamp may be delaminated from the imprint resin layer to form a slanted grating within the imprint resin layer. The slanted grating within the imprint resin layer may have a positive tone.

Even though not shown in FIG. 11, in some embodiments, a fourth generation hybrid stamp, a fifth generation hybrid stamp, and so on, may be fabricated using a similar process, and may be used as the working stamp for imprinting the slanted grating. In some implementations, the surface of any of the master mold, gen 1 stamp, Gen 2 stamp, and Gen 3 stamp may be coated or plated prior to imprinting to reduce wearing of the mold, improve product quality, and reduce manufacturing cost. For example, in some implementations, an anti-sticking layer may be coated on the mold before the molding (or imprinting) process.

Optionally, at block 1195, the slanted grating may be over-coated with a material having a refractive index different from the slanted grating (e.g., the imprint resin layer). The overcoat material may be substantially transparent to visible light. Depending on the applications, the overcoat material may have a refractive index higher or lower than the refractive index of the material forming the grating ridges. In some embodiments, the material forming the grating ridges may include amorphous silicon, silicon oxide, silicon nitride, silicon carbide, silicon oxynitride ($SiO_xN_y$), spin on carbon (SOC), amorphous carbon, diamond like carbon (DLC), titanium oxide, aluminum oxide, tantalum oxide, or hafnium oxide. In some embodiments, a high refractive index material, such as hafnium oxide, titanium oxide, tantalum oxide, tungsten oxide, zirconium oxide, gallium sulfide, gallium nitride, gallium phosphide, silicon, silicon nitride, or a high refractive index polymer, may be used to fill the grating grooves. In some embodiments, a low refractive index material, such as silicon oxide, alumina, porous silica, or fluorinated low index monomer (or polymer), may be used to fill the grating grooves. As a result, the difference between the refractive index of the grating ridges and the refractive index of the grating grooves filled with the overcoat material may be greater than about 0.01, greater than about 0.05, greater than about 0.1, greater than about 0.2, greater than 0.3, greater than about 0.5, greater than about 1.0, or higher.

Techniques for applying the overcoat layer on a surface-relief grating may include, for example, spin coating techniques. Generally, spin-coating techniques may work well to overcoat a relatively flat surface. However, it may be challenging to achieve a uniform overcoat layer when the surface to be overcoated includes some surface-relief structures (e.g., surface-relief gratings) formed thereon, and it may be even more difficult to achieve a uniform overcoat layer when the surface-relief structures are non-uniform across the surface, or when some surfaces are shadowed by other surfaces and/or structures. For example, the top surface of the overcoat layer may not be flat because the spin-on material may follow the topography of the underlying surface-relief structures, which may have varying slant angles, duty cycles, depths, and the like. As such, the top surface of the overcoat layer at grating grooves may be lower than the top surface of the overcoat layer at grating ridges. The uneven surface of the overcoat layer may degrade the performance of the surface-relief grating, such as causing stray light, reducing the coupling efficiency, increasing display leakage, and the like. The resultant thickness of the overcoat layer on the surface-relief structures using spin-coating techniques may also vary across the surface due to the varying slant angles, duty cycles, depths, grating periods, and the like. In many artificial reality applications, it may be desirable to precisely control the thickness and the surface roughness of the overcoat layer to improve the performance of the surface-relief grating and the display system. For example, it may be desirable that the thickness of the overburden of the overcoat layer (e.g., the portion of the overcoat layer on top of the grating ridges) is less than about 20 nm, and the surface peak-to-valley height is less than about 5 nm.

Figure 12:
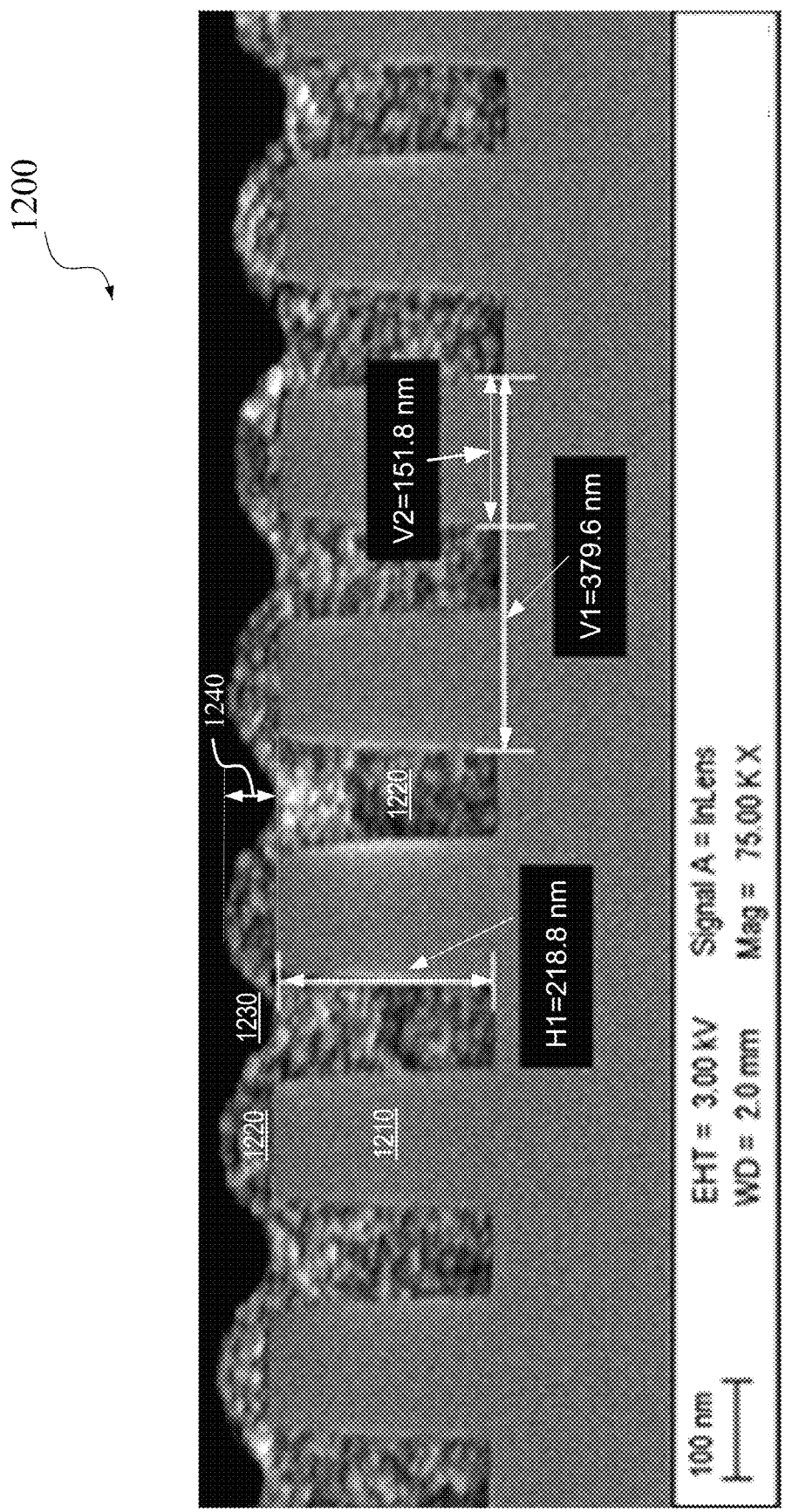
FIG. 12 includes an image of a cross-section of an example of a surface-relief grating including an overcoat layer having an uneven top surface.

FIG. 12 includes an image of a cross-section of an example of a surface-relief grating 1200 including an overcoat layer 1220. Surface-relief grating 1200 may include substantially vertical grating ridges 1210 etched or otherwise formed in a grating layer (e.g., a substrate or a waveguide as described above). Surface-relief grating 1200 may have a sub-wavelength grating period, a large duty cycle (e.g., greater than 50%), and a large grating ridge height. In the illustrated example, the grating period of surface-relief grating 1200 may be about 230 nm, the width of grating ridges 1210 at the bottom may be about 150 nm, and the height of grating ridges 1210 (or the depth of the grating grooves) may be about 220 nm. Overcoat layer 1220 may fill the grating grooves and may also be on top of grating ridges 1210. However, the top surface of overcoat layer 1220 may not be flat. For example, regions 1230 on the grating grooves may not have the overcoat material, and the overcoat material on top of grating ridges 1210 may also have a curved shape. In the example shown in FIG. 12, the surface peak-to-valley height 1240 may be greater than about 50 nm.

Some techniques, such as chemical mechanical polishing (CMP) techniques or etching techniques (e.g., slanted etching or gray scale etching), may be used to planarize the top surface of the overcoat layer on the surface-relief grating. However, the CMP techniques may not precisely control the thickness of the overcoat layer on top of the surface-relief grating (the overburden). In addition, CMP may not achieve the desired results (e.g., with surface peak-to-valley height less than about 5 nm) for hybrid overcoat materials that include organic materials mixed with nanoparticles (e.g., having a linear dimension about 10 nm to about 15 nm, which is greater than the desired surface peak-to-valley height or surface roughness), and may also increase the complexity and the cost. Etching techniques may not precisely control the thickness of the overburden either. In addition, the etching process may not properly etch hybrid overcoat materials that include organic materials mixed with nanoparticles. For example, the nanoparticles and other residues may accumulate at the etched surface.

According to certain embodiments, an imprint technique as described above and in more detail below may be used to form a planarized overcoat layer on a surface-relief grating, such as a slanted surface-relief grating, or a surface-relief grating with varying grating parameters across the area of the surface-relief grating. In one example, an overcoat material that includes a base resin, nanoparticles, a crosslink initiator, and/or a solvent may be dispensed on the surface-relief grating by, for example, spin-coating or inkjet printing. The amount of overcoat material dispensed on the surface-relief grating may be determined based on the dimensions of the grating grooves and the desired thickness of the overburden (e.g., the portion of the overcoat layer on top of the grating ridges). For example, in some surface-relief gratings, the grating parameters may be non-uniform across the surface-relief grating, and thus different amounts of overcoat material may be dispensed at different regions of the surface-relief gratings. After dispensing the overcoat material, the top surface of the overcoat layer may not be flat as shown by the example illustrated in FIG. 12. The dispensed overcoat material may optionally be baked to remove the solvent and/or trapped air (e.g., bubbles) in the overcoat layer. An imprint process using a planar imprint stamp or mold may then be performed to press the overcoat layer, thereby forming a flat top surface on the overcoat layer. The overcoat layer may then be cured (e.g., using UV light) to crosslink and fix the base resin in the overcoat material. After the curing, the planar imprint stamp or mold may be delaminated or otherwise detached from the overcoat layer and the surface-relief grating. According to certain embodiments, after detaching the planar imprint stamp from the layer of the overcoat material, the thickness of the overcoat layer on top of the plurality of grating ridges may be equal to or less than about 20 nm. A surface peak-to-valley height of the top surface of the overcoat layer may be equal to or less than about 5 nm.

In some examples, the base resin of the overcoat material may include carbon-based organic base resin. The base resin may further include hydrogen, sulfur, oxygen, nitrogen, or various other elements. The organic base resin may include one or more derivatives of bisfluorene, dithiolane, thianthrene, biphenol, o-phenylphenol, phenoxy benzyl, bisphenol A, bisphenol F, benzyl, phenol, and the like. The organic base resin may have a refractive index greater than or about 1.45, greater than or about 1.5, greater than or about 1.55, greater than or about 1.57, greater than or about 1.58, or greater than or about 1.6. In some examples, the base resin may include inorganic or metal elements, such as silicone-based base resin materials that include an inorganic silicon-oxygen backbone chain. A silicone-based base resin may have a refractive index of 1.55 or lower for light with a wavelength about 589 nm, and thus may have a refractive index lower than or greater than the refractive index of an organic base resin.

The overcoat material may include an electromagnetic radiation sensitive material, more specifically, a light-curable material. For example, the base resin may include a light-sensitive or light-curable base resin that may include monomers, oligomers, or polymers having one or more aromatic and thio-aromatic units, such as monomers, oligomers, or polymers of one or more derivatives of bisfluorene, dithiolane, thianthrene, biphenol, o-phenylphenol, phenoxy benzyl, bisphenol A, bisphenol F, benzyl, phenol, and the like. In some embodiments, the base resin may include at least one actinic light curable moiety chosen from the group of acrylate, epoxide, vinyl, thiols, allyls, vinylether, allylethers, epoxyacrylates, urethane acrylates, and polyester acrylates. Depending on the base material forming the base resin, the base resin may have a refractive index between about 1.5 and about 1.8. In some embodiments, the base resin may have a refractive index between about 1.55 and about 1.8 or between about 1.6 and about 1.8.

The refractive index of the base resin may be affected by the functional groups of the base resin. Different base resin materials formed of a common base material but having different functional groups may have different refractive indices. For example, a base resin material may include one or more functional groups, including but not limited to, crosslinking functional groups, such as ethylenically unsaturated group, oxirane ring, and the like. A base resin containing the oxirane ring may generally have a higher refractive index than a base resin containing the ethylenically unsaturated group.

The base resin material may be selected based on its refractive index, its interaction with other components of the overcoat material, the associated processing techniques or mechanisms for crosslinking or curing the base resin, and the like. Although the base resin materials described herein can generally be cured by UV light or light having wavelengths ranging from about 254 nm to about 415 nm or other curing methods (e.g., electron beam curing, etc.), the base resin materials having different functional groups may be cured or crosslinked using different crosslinking mechanisms and/or under different operating conditions, and thus may be selected based on the various processing parameters for imprint molding the overcoat layer.

Depending on the crosslinking functional group a base resin contains, the base resin may be crosslinked or polymerized via radical photopolymerization (such as free radical photopolymerization or controlled radical photopolymerization), or ionic photopolymerization (such as cationic photopolymerization or anionic photopolymerization). For example, a base resin containing the ethylenically unsaturated group may be crosslinked or polymerized via radical photopolymerization, such as free radical photopolymerization. To facilitate the polymerization of a base resin containing the ethylenically unsaturated group, the overcoat material mixture may further include one or more photoradical generators (PRGs). Under UV radiation, the PRGs may generate radicals that may initiate the polymerization or crosslinking process of the ethylenically unsaturated group of the base resin molecules. When the base resin contains the oxirane ring, the base resin may be crosslinked or polymerized via ionic photopolymerization, such as cationic photopolymerization. To facilitate the polymerization of a base resin containing the oxirane ring, the overcoat material mixture may further include one or more photo-acid generators (PAGs). Under UV radiation, the PAGs may generate cations or acids that may initiate the polymerization or crosslinking process of the oxirane ring of the base resin molecules.

Although different crosslinking mechanisms may be implemented, the various base resin materials described herein are generally flowable or in liquid form at room temperature, and thus the overcoat material mixture may be molded or imprinted at an imprinting temperature close to room temperature, which may include a temperature from about 15° C. to about 50° C. In other words, the various base resin materials described herein may generally allow the overcoat material mixture to be molded or imprinted without applying heat to the overcoat material or the substrate upon which the overcoat material is applied, although thermal processing may be involved in other operations (e.g., baking or polymerization) of the overcoat molding process. In some embodiments, thermal treatment may nonetheless be implemented during molding so as to reduce the viscosity of the overcoat material and facilitate the flow of the overcoat material during molding.

The overcoat material may further include nanoparticles for tuning the refractive index of the overcoat material. For example, in some embodiments, the nanoparticles may include one or more metal oxides, such as titanium oxide, zirconium oxide, hafnium oxide, tungsten oxide, any derivatives thereof, another metal oxide or derivatives thereof having relatively high refractive indices, or a combination thereof. In some embodiments, the nanoparticles may include zinc tellurium, gallium phosphide, or any derivatives thereof. Depending on the materials and/or the composition, when more than one type of nanoparticles are used to form a blend of nanoparticles, the nanoparticles may have a refractive index between about 1.7 and about 3.4, between about 1.75 and about 3.4, or between about 1.8 and about 3.4.

In general, the base resin material, the functional group of the base resin material, the nanoparticle material, and/or the loading (concentration or density) of the nanoparticles can be selected to tune the refractive index of the cured overcoat material. In some embodiments, the cured overcoat material may have a refractive index between about 1.7 and about 3.4, between about 1.75 and about 3.2, or between about 1.75 and about 3.1, depending on the overcoat material composition. For example, the overcoat layer may have a refractive index greater than or about 1.78, greater than or about 1.8, greater than or about 1.85, greater than or about 1.9, greater than or about 1.95, greater than or about 2, or greater.

In one example, the overcoat material used to form the overcoat layer with a flat top surface using the imprint techniques disclosed herein may include a base resin (e.g., acrylate resin with photo radical generator or thermal radical generator), $TiO_x$ nanoparticle with acrylate ligands decoration, and a solvent blend including one or more solvents. The base resin may include, for example, high refractive index monomers (e.g., thianthrene diacrylate), an acrylate crosslinker, a surface cure modifier, a fluorinated additive, a photo-initiator, any combination thereof, and the like. The photo-initiator may include, for example, Diphenyl(2,4,6 trimethylbenzoyl)phosphine oxide and/or 2-Hydroxy-2-methylpropiophenone. The solvent may include, for example, propylene glycol methyl ether acetate (PGMEA) or dipropylene glycol methyl ether. The solvent may have a boiling point greater than about 160° C. The nanoparticles (e.g., titanium oxide) may be dispersed in the PGMEA solvent.

Figure 13A:
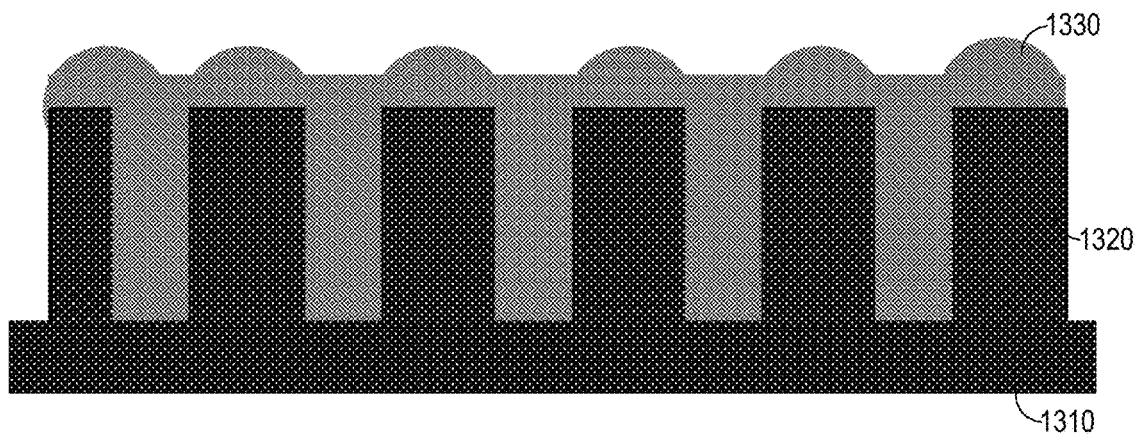
FIGS. 13A-13C illustrate an example of a method of forming a planarized overcoat layer on a surface-relief grating according to certain embodiments.
Figure 13B:
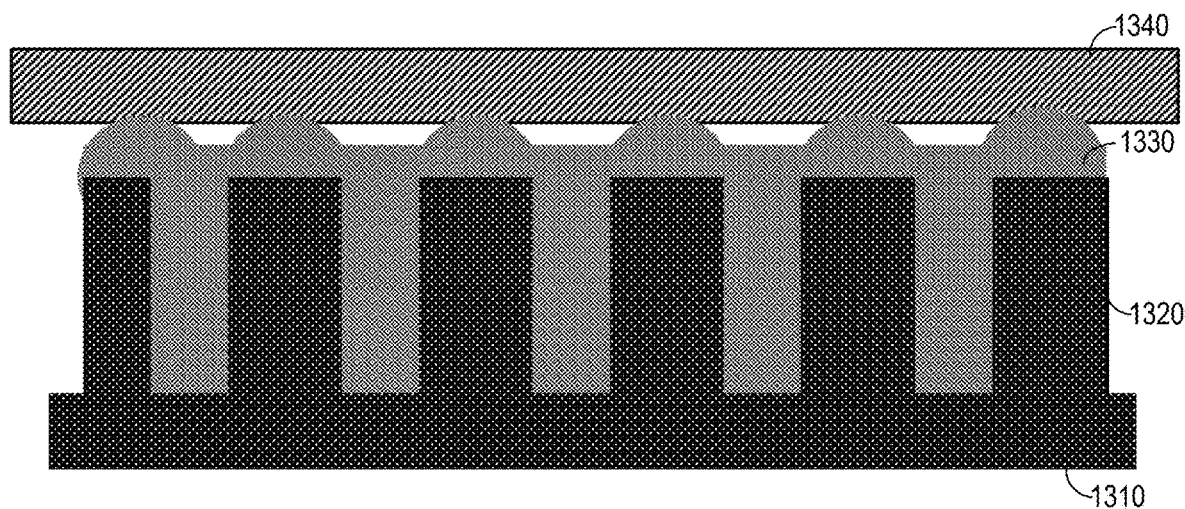
Figure 13C:
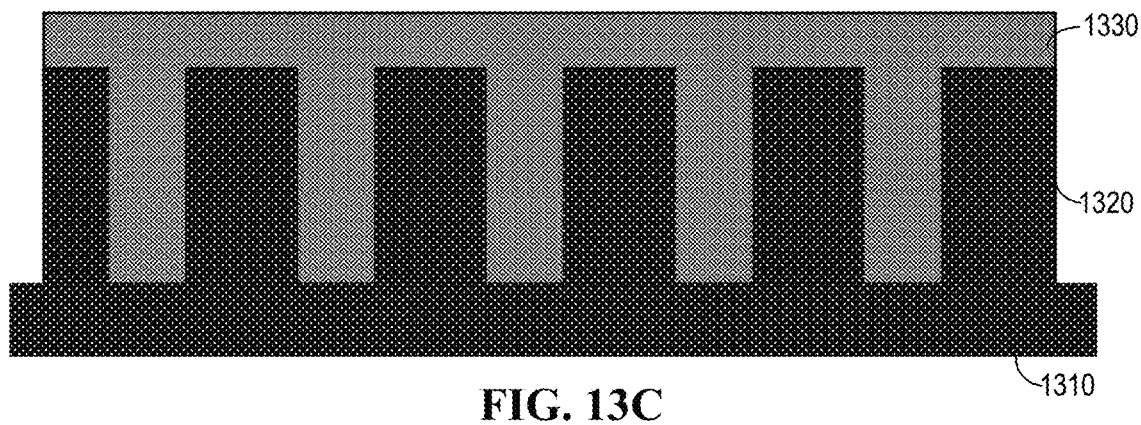

FIGS. 13A-13C illustrate an example of a method of forming a planarized overcoat layer on a surface-relief grating using an imprint process according to certain embodiments. FIG. 13A shows that an overcoat material as described above may be dispensed on a surface-relief grating 1320 formed in or on a substrate 1310 to form an overcoat layer 1330. Surface-relief grating 1320 may have a sub-wavelength grating period, a large duty cycle (e.g., greater than 50%), and a large grating ridge height (e.g., a few hundred nanometers or higher). The overcoat material may be dispensed by, for example, spin-coating or inkjet printing. The amount of overcoat material dispensed on surface-relief grating 1320 may be determined based on the dimensions of the grating grooves and the desired thickness of the overburden (e.g., the portion of the overcoat layer on top of the grating ridges). For example, as described above, it may be desirable that the overburden thickness is less than about 20 nm. After dispensing the overcoat material, the top surface of overcoat layer 1330 may not be flat as shown in the illustrated example of FIG. 13A. For example, the height of the top surface of overcoat layer 1330 at the grating ridge regions may be greater than the height of the top surface of overcoat layer 1330 at the grating groove regions.

In some embodiments, air trapping (e.g., air bubbles) may occur in the grating grooves when spin-coating techniques are employed, and/or the solvent in the overcoat material may not have completely evaporated before the curing. The solvent and/or trapped air may result in a varying refractive index in the overcoat layer and an efficiency loss. The problems may be exacerbated when the grating grooves are relatively deep (e.g., about 100 nm, 200 nm, 300 nm, or greater), when the grating grooves are relatively narrow (e.g., gratings with large duty cycles), and/or when the slant angles of the grating ridges are relatively large, such as greater than about 30°, 45°, 50°, 70°, or larger. Therefore, in some embodiments, the overcoat layer may optionally be baked to remove the solvent and the trapped air from the overcoat layer, such that the overcoat material in the overcoat layer may be more uniform or homogeneous.

FIG. 13B shows that a planar imprint stamp 1340 (e.g., a soft stamp or mold described above) may be laminated or otherwise applied on overcoat layer 1330 in an imprint process. As described above, in some embodiments, planar imprint stamp 1340 may include polydimethylsiloxane (PDMS) or another silicone elastomer or silicon-based organic polymer. In some embodiments, planar imprint stamp 1340 may include ethylene tetrafluoroethylene (ETFE), perfluoropolyether (PFPE), or other fluorinated polymer materials. The bottom surface of planar imprint stamp 1340 that contacts overcoat layer 1330 may be flat and may have a low surface roughness. Planar imprint stamp 1340 may be pressed against overcoat layer 1330, for example, using a roller as described above with respect to, for example, FIG. 10B. As described above, the overcoat material in overcoat layer 1330 may be flowable at the imprinting temperature (e.g., room temperature or an elevated temperature). Thus, some portions of the flowable overcoat material on top of the grating ridges may be forced to the regions on top of the grating grooves, such that the flat bottom surface of planar imprint stamp 1340 may be transferred to the top surface of overcoat layer 1330.

Overcoat layer 1330 may then be cured (e.g., using UV light) to crosslink and fix the base resin in the overcoat material as described above. After the curing and the crosslinking of the overcoat material, planar imprint stamp 1340 may be delaminated or otherwise detached from overcoat layer 1330 and the surface-relief grating, as described above with respect to, for example, FIG. 10C.

FIG. 13C shows that, after the delamination of planar imprint stamp 1340, the top surface of overcoat layer 1330 can be flat and smooth (e.g., with a surface peak-to-valley height equal to or less than about 5 nm). In addition, the overburden can be very thin, such as less than about 20 nm.

Figure 14:
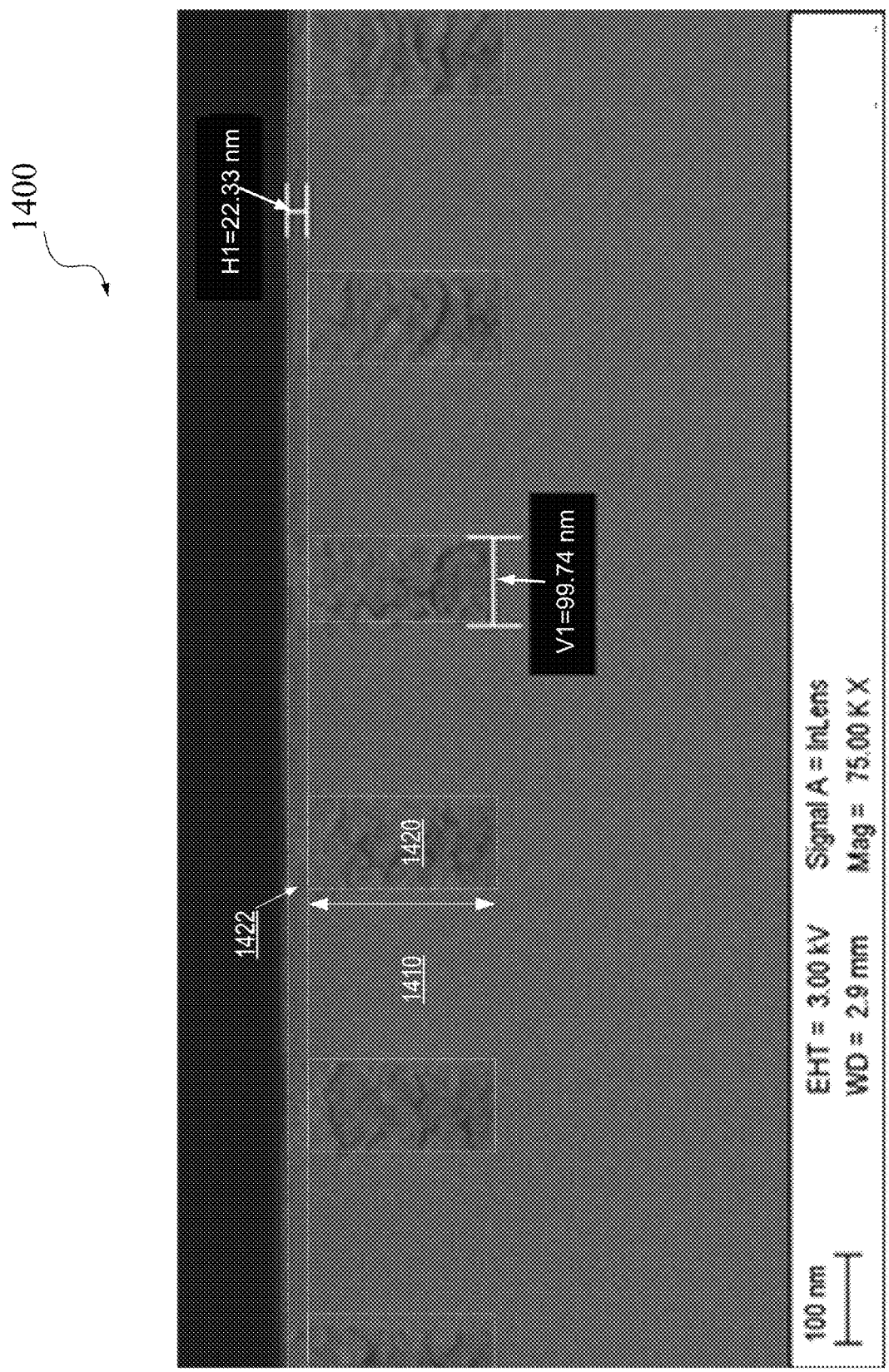
FIG. 14 includes an image of a cross-section of an example of a surface-relief grating including a planarized overcoat layer according to certain embodiments.

FIG. 14 includes an image of a cross-section of an example of a surface-relief grating 1400 including a planarized overcoat layer according to certain embodiments. Surface-relief grating 1400 may include substantially vertical grating ridges 1410 etched or otherwise formed in a grating layer (e.g., a substrate). Surface-relief grating 1400 may have a sub-wavelength grating period, a large duty cycle (e.g., greater than 50%), and a large grating ridge height (e.g., a few hundred nanometers or higher). In the illustrated example, the grating period of surface-relief grating 1400 may be about 300 nm, the width of grating ridges 1410 at the bottom may be about 100 nm, and the height of grating ridges 1410 (or the depth of the grating grooves) may be about 200 nm. Overcoat layer 1420 may fill the grating grooves and may also be on top of grating ridges 1410. The top surface of overcoat layer 1420 may be very flat. For example, the surface peak-to-valley height of the top surface of overcoat layer 1420 may be less than about 5 nm, less than about 4 nm, less than about 3 nm, or lower. The overburden 1422 may also be very thin. For example, in the example shown in FIG. 14, the thickness of overburden 1422 may be about 22 nm. A thinner overburden may be achieved by dispensing less overcoat material during the imprinting.

Figure 15A:
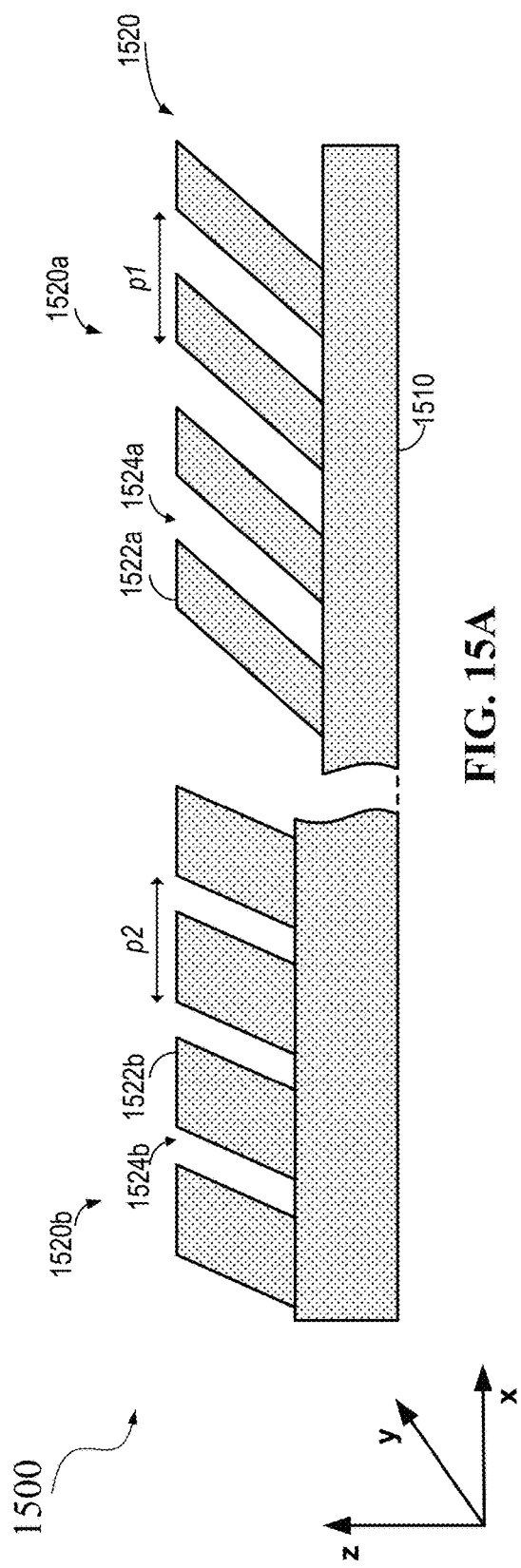
FIG. 15A includes a cross-sectional view of an example of a slanted surface-relief grating in an example of a waveguide display according to certain embodiments.

FIG. 15A illustrates an example of a slanted surface-relief grating in a waveguide display 1500 according to certain embodiments. Waveguide display 1500 may include slanted surface-relief structures, such as slanted surface-relief gratings 1520 on a substrate 1510 (e.g., a waveguide). Slanted surface-relief gratings 1520 may have sub-wavelength grating periods, large grating ridge heights (e.g., a few hundred nanometers or higher), and a large duty-cycle range (e.g., within about 10% and about 90%). As discussed above and also shown in FIG. 15A, the configuration of the slanted surface-relief gratings 1520 may vary across substrate 1510 so as to increase the coupling efficiency of the light to user's eyes. For example, some slanted gratings 1520*a* may include a period $p_1$ that may be different from the period $p_2$ of other slanted gratings 1520*b*. The heights of ridges 1522*a* and 1522*b*, the depths of grooves 1524*a* and 1524*b*, and the slant angles of the leading edges and the trailing edges of ridges 1522*a* and 1522*b* may also vary. The widths of ridges 1522*a* and 1522*b* and/or the widths of grooves 1524*a* and 1524*b* may vary as well, leading to varied duty cycles of slanted gratings 1520*a* and 1520*b*. The varied configuration of slanted surface-relief gratings 1520 may pose additional challenges to overcoat slanted surface-relief gratings 1520 uniformly and/or to form a substantially planar top surface of the overcoat layer.

Figure 15B:
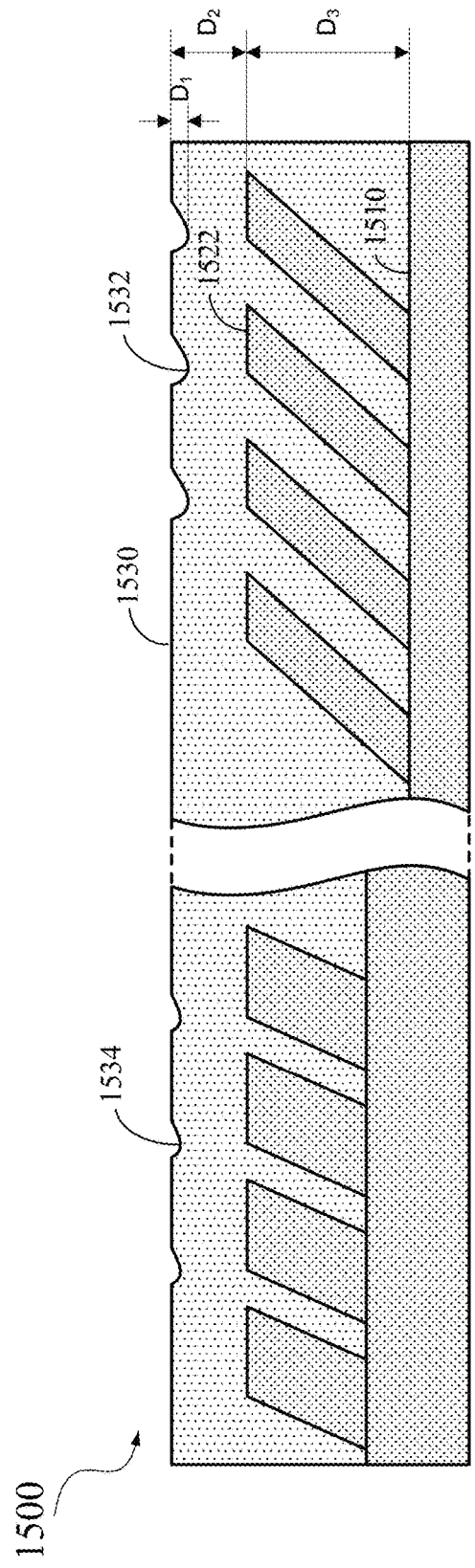
FIG. 15B includes a cross-sectional view of an example of a slanted surface-relief grating with an overcoat layer.

FIG. 15B illustrates slanted surface-relief grating 1520 of FIG. 15A with an overcoat layer 1530 formed thereon. Due to the different grating parameters at different regions of slanted surface-relief grating 1520, overcoat layer 1530 formed using other techniques may not have a flat top surface. The depth $D_1$ of surface recesses 1532 and 1534 may vary depending on the structure of the slanted surface-relief gratings, such as the duty cycles of the slanted gratings, the width of the ridges and/or the grooves, the slant angles of the leading and trailing edges of the ridges, the depths $D_3$ of the grating grooves, and the like. For example, regions of slanted surface-relief grating 1520 having a low etch depth and/or having a large duty cycle (and thus shallow and/or narrow grating grooves) may have a lower surface peak-to-valley height as shown by surface recesses 1534, whereas regions of slanted surface-relief grating 1520 having a high etch depth and/or having a small duty cycle (and thus deep and/or wide grating grooves) may have a higher surface peak-to-valley height as shown by surface recesses 1532. In some embodiments, the overburden thickness $D_2$ may also vary across regions of slanted surface-relief grating 1520. For example, the overburden thickness $D_2$ in regions where more overcoat material may be needed to fill the grating grooves may be lower than the overburden thickness $D_2$ in regions where less overcoat material may be needed to fill the grating grooves. In some implementations, the depths $D_3$ of the grating grooves may be greater than or about 100 nm, greater than or about 150 nm, greater than or about 200 nm, greater than or about 250 nm, greater than or about 300 nm, or greater.

In the nanoimprinting techniques described above, applying the planar imprint stamp and the compressive force may move the overcoat material within a small region, such as about a few hundred microns, which may depend on the flowability or viscosity of the overcoat material. As such, the overburn thickness in different regions having different grating parameters may be different if similar amounts of overcoat material are dispensed at different regions of the surface-relief grating. In some embodiments, to achieve a flat top surface, the amounts of overcoat material dispensed on different regions of the surface-relief grating may need to be different, which may be achieved by, for example, inkjet printing, or 3D printing.

FIGS. 16A-16B illustrate an example of a method of forming a planarized overcoat layer on a surface-relief grating 1600 having variable grating parameters according to certain embodiments. FIG. 16A shows surface-relief grating 1600 including grating ridges 1620 on a substrate 1610 (or a grating material layer or waveguide), where the period, duty cycle, slant angle, and/or grating depth of surface-relief grating 1600 may vary from region to region. Inkjet printing or 3D printing techniques may be used to dispense different amounts of overcoat material 1630 in different regions of surface-relief grating 1600. The amount of overcoat material dispensed may be more precisely controlled by dispensing small drops of overcoat material 1630. For example, a larger number of small drops of overcoat material 1630 may be dispensed in regions where the dimensions of the grating grooves are larger, and a smaller number of small drops of overcoat material 1630 may be dispensed in regions where the dimensions of the grating grooves are smaller.

FIG. 16B shows that a planar imprint stamp 1640 may be laminated or otherwise applied on overcoat material 1630, for example, after an optional baking process to remove solvent and/or trapped air. Planar imprint stamp 1640 may be pressed against overcoat material 1630, for example, using a roller as described above with respect to, for example, FIG. 10B. Thus, some portions of the overcoat material 1630 on top of grating ridges 1620 may be forced to the regions on top of the grating grooves, and the flat bottom surface of planar imprint stamp 1640 may be transferred to the top surface of the overcoat layer formed by overcoat material 1630. Overcoat material 1630 may be cured (e.g., using UV light) to crosslink and fix the base resin as described above. After the curing and the crosslinking of overcoat material 1630, planar imprint stamp 1640 may be delaminated or otherwise detached from the overcoat material layer and the surface-relief grating, as described above with respect to, for example, FIG. 10C. In this way, the top surface of the overcoat layer may be flat. Because the amount of overcoat material dispensed can be more precisely controlled, the thickness of the overburden can be more precisely controlled, and can be very thin, such as less than about 20 nm, less than about 10 nm, or less.

Figure 17:
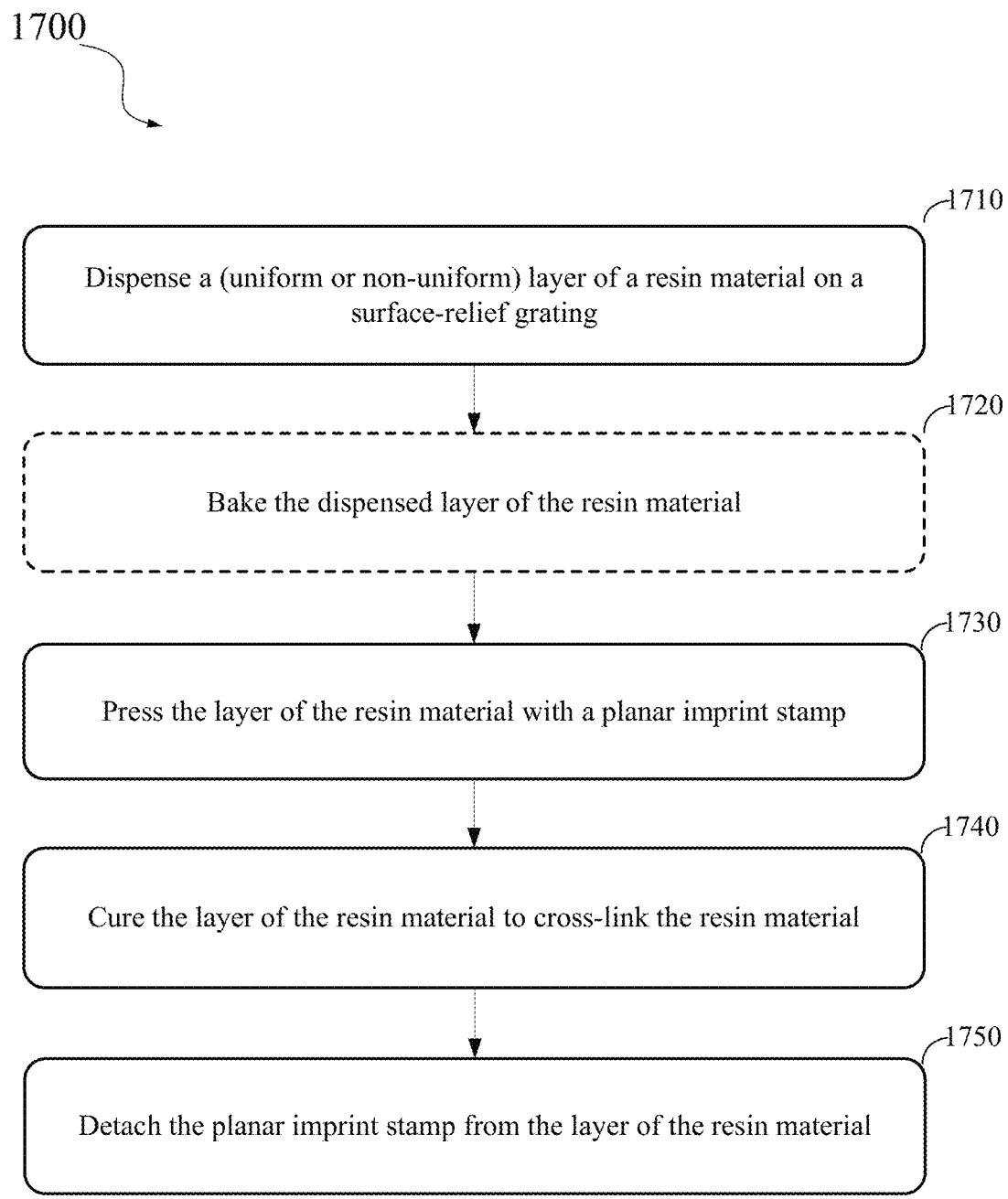
FIG. 17 includes a flowchart illustrating an example of a process for forming a planarized overcoat layer on a surface-relief grating according to certain embodiments.

FIG. 17 includes a flowchart 1700 illustrating an example of a process for forming a planarized overcoat layer on a surface-relief grating according to certain embodiments. The operations described in flowchart 1700 are for illustration purposes only and are not intended to be limiting. In various implementations, modifications may be made to flowchart 1700 to add additional operations, to omit some operations, or to change the order of the operations. The operations described in flowchart 1700 may be performed by, for example, one or more semiconductor fabrication systems, nanoimprint systems, inkjet printing system, 3D printing system, and the like.

At block 1710, the operations may include dispensing a layer of a resin material on a surface-relief grating that includes a plurality of grating grooves, where the resin material may be curable by heat or electromagnetic radiation. The resin material may include a base resin, nanoparticles, and a solvent. In some embodiments, the base resin may include at least one actinic light curable moiety chosen from acrylate, epoxide, vinyl, thiols, allyls, vinylether, allylethers, epoxyacrylates, urethane acrylates, and polyester acrylates. In some embodiments, the base resin may include monomers, oligomers, or polymers of one or more derivatives from bisfluorene, dithiolane, thianthrene, biphenol, o-phenylphenol, phenoxy benzyl, bisphenol A, bisphenol F, benzyl, and phenol. In some embodiments, the base resin may include a light-sensitive base resin, the light-sensitive base resin may include a crosslinking group, and the crosslinking group may include an ethylenically unsaturated group or an oxirane ring. In some embodiments, the nanoparticles may include at least one of titanium oxide, zirconium oxide, hafnium oxide, tungsten oxide, zinc tellurium, gallium phosphide, a derivative of any of the preceding materials, or a combination thereof. The nanoparticles may have linear dimensions (e.g., diameters) less than about 20 nm, such as about 10-15 nm or about a few nanometers. In some embodiments, the base resin may include at least one of a photo radical generator or a photo acid generator. In one example, the base resin may include acrylate monomers, a acrylate crosslinker, a surface cure modifier, a fluorinated additive, and a photo-initiator. The solvent may include, for example, propylene glycol methyl ether acetate (PGMEA) or dipropylene glycol methyl ether. In some embodiments, the resin material may be flowable at room temperature. Dispensing the layer of the resin material on the surface-relief grating may include spin-coating the layer of the resin material on the surface-relief grating, or dispensing a plurality of small drops of the resin material on the surface-relief grating by, for example, inkjet printing or 3D printing. In some embodiments, the plurality of grating grooves may have at least one of a non-uniform depth, a non-uniform pitch, a non-uniform width, or a non-uniform slant angle, where dispensing the layer of the resin material on the surface-relief grating may include dispensing different amounts of the resin material on two or more different regions the surface-relief grating using, for example, inkjet printing or 3D printing.

Optionally, at block 1720, the dispensed resin material may be bake at, for example, 50° C. or higher, 100° C. or higher, or 150° C. or higher, to remove the solvent and/or air trapped in the resin material.

At block 1730, the operations may include pressing the layer of the resin material using a planar imprint stamp, where the plurality of grating grooves may be filled with the resin material due to the pressing. The pressing can be performed using, for example, a roller. In some embodiments, the planar imprint stamp may include a planar hard stamp or mold. In some embodiments, the planar imprint stamp may include a planar soft stamp made of, for example, polydimethylsiloxane (PDMS) or another silicone elastomer or silicon-based organic polymer. In some embodiments, the planar imprint stamp may include ethylene tetrafluoroethylene (ETFE), perfluoropolyether (PFPE), or other fluorinated polymer materials. The planar imprint stamp may or may not be transparent to UV light. A peak-to-valley height of the surface of planar imprint stamp that contacts the layer of the resin material may be less than about 5 nm.

At block 1740, the operations may include curing the resin material in the layer of the resin material. The curing may include thermal curing or electromagnetic radiation, such as UV light radiation. For example, the curing may be performed by illuminating the resin material using UV light that may pass through the planar imprint stamp or the substrate of the surface-relief grating. The curing may cause crosslinking or fixing of the resin material to form polymers.

At block 1750, the planar imprint stamp may be detached from the layer of resin material. After detaching the planar imprint stamp from the layer of the resin material, the resin material may have a refractive index between about 1.45 and about 3.4, and the thickness of the layer of the resin material on top of the plurality of grating ridges may be equal to or less than 20 nm. A surface peak-to-valley height of a top surface of the overcoat layer may be equal to or less than about 5 nm.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 18:
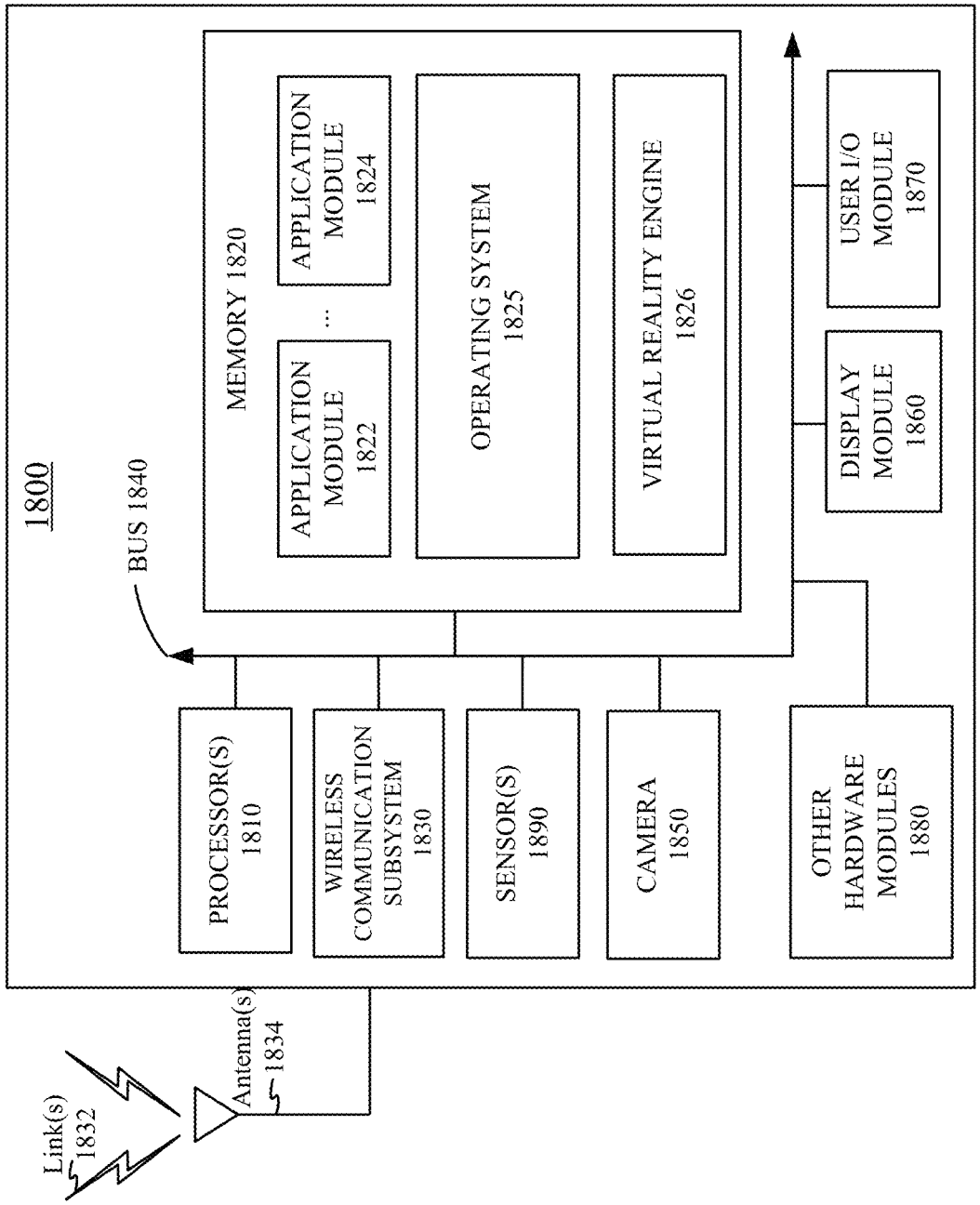
FIG. 18 is a simplified block diagram of an example electronic system of an example near-eye display for implementing some of the examples disclosed herein.

FIG. 18 is a simplified block diagram of an example electronic system 1800 of an example near-eye display (e.g., HMD device) for implementing some of the examples disclosed herein. Electronic system 1800 may be used as the electronic system of an HMD device or other near-eye displays described above. In this example, electronic system 1800 may include one or more processor(s) 1810 and a memory 1820. Processor(s) 1810 may be configured to execute instructions for performing operations at a number of components, and can be, for example, a general-purpose processor or microprocessor suitable for implementation within a portable electronic device. Processor(s) 1810 may be communicatively coupled with a plurality of components within electronic system 1800. To realize this communicative coupling, processor(s) 1810 may communicate with the other illustrated components across a bus 1840. Bus 1840 may be any subsystem adapted to transfer data within electronic system 1800. Bus 1840 may include a plurality of computer buses and additional circuitry to transfer data.

Memory 1820 may be coupled to processor(s) 1810. In some embodiments, memory 1820 may offer both short-term and long-term storage and may be divided into several units. Memory 1820 may be volatile, such as static random access memory (SRAM) and/or dynamic random access memory (DRAM) and/or non-volatile, such as read-only memory (ROM), flash memory, and the like. Furthermore, memory 1820 may include removable storage devices, such as secure digital (SD) cards. Memory 1820 may provide storage of computer-readable instructions, data structures, program modules, and other data for electronic system 1800. In some embodiments, memory 1820 may be distributed into different hardware modules. A set of instructions and/or code might be stored on memory 1820. The instructions might take the form of executable code that may be executable by electronic system 1800, and/or might take the form of source and/or installable code, which, upon compilation and/or installation on electronic system 1800 (e.g., using any of a variety of generally available compilers, installation programs, compression/decompression utilities, etc.), may take the form of executable code.

In some embodiments, memory 1820 may store a plurality of application modules 1822 through 1824, which may include any number of applications. Examples of applications may include gaming applications, conferencing applications, video playback applications, or other suitable applications. The applications may include a depth sensing function or eye tracking function. Application modules 1822-1824 may include particular instructions to be executed by processor(s) 1810. In some embodiments, certain applications or parts of application modules 1822-1824 may be executable by other hardware modules 1880. In certain embodiments, memory 1820 may additionally include secure memory, which may include additional security controls to prevent copying or other unauthorized access to secure information.

In some embodiments, memory 1820 may include an operating system 1825 loaded therein. Operating system 1825 may be operable to initiate the execution of the instructions provided by application modules 1822-1824 and/or manage other hardware modules 1880 as well as interfaces with a wireless communication subsystem 1830 which may include one or more wireless transceivers. Operating system 1825 may be adapted to perform other operations across the components of electronic system 1800 including threading, resource management, data storage control and other similar functionality.

Wireless communication subsystem 1830 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1800 may include one or more antennas 1834 for wireless communication as part of wireless communication subsystem 1830 or as a separate component coupled to any portion of the system. Depending on desired functionality, wireless communication subsystem 1830 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1830 may permit data to be exchanged with a network, other computer systems, and/or any other devices described herein. Wireless communication subsystem 1830 may include a means for transmitting or receiving data, such as identifiers of HMD devices, position data, a geographic map, a heat map, photos, or videos, using antenna(s) 1834 and wireless link(s) 1832. Wireless communication subsystem 1830, processor(s) 1810, and memory 1820 may together comprise at least a part of one or more of a means for performing some functions disclosed herein.

Embodiments of electronic system 1800 may also include one or more sensors 1890. Sensor(s) 1890 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1890 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1800 may include a display module 1860. Display module 1860 may be a near-eye display, and may graphically present information, such as images, videos, and various instructions, from electronic system 1800 to a user. Such information may be derived from one or more application modules 1822-1824, virtual reality engine 1826, one or more other hardware modules 1880, a combination thereof, or any other suitable means for resolving graphical content for the user (e.g., by operating system 1825). Display module 1860 may use liquid crystal display (LCD) technology, light-emitting diode (LED) technology (including, for example, OLED, ILED, µLED, AMOLED, TOLED, etc.), light emitting polymer display (LPD) technology, or some other display technology.

Electronic system 1800 may include a user input/output module 1870. User input/output module 1870 may allow a user to send action requests to electronic system 1800. An action request may be a request to perform a particular action. For example, an action request may be to start or end an application or to perform a particular action within the application. User input/output module 1870 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1800. In some embodiments, user input/output module 1870 may provide haptic feedback to the user in accordance with instructions received from electronic system 1800. For example, the haptic feedback may be provided when an action request is received or has been performed.

Electronic system 1800 may include a camera 1850 that may be used to take photos or videos of a user, for example, for tracking the user's eye position. Camera 1850 may also be used to take photos or videos of the environment, for example, for VR, AR, or MR applications. Camera 1850 may include, for example, a complementary metal-oxide-semiconductor (CMOS) image sensor with a few millions or tens of millions of pixels. In some implementations, camera 1850 may include two or more cameras that may be used to capture 3-D images.

In some embodiments, electronic system 1800 may include a plurality of other hardware modules 1880. Each of other hardware modules 1880 may be a physical module within electronic system 1800. While each of other hardware modules 1880 may be permanently configured as a structure, some of other hardware modules 1880 may be temporarily configured to perform specific functions or temporarily activated. Examples of other hardware modules 1880 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1880 may be implemented in software.

In some embodiments, memory 1820 of electronic system 1800 may also store a virtual reality engine 1826. Virtual reality engine 1826 may execute applications within electronic system 1800 and receive position information, acceleration information, velocity information, predicted future positions, or some combination thereof of the HMD device from the various sensors. In some embodiments, the information received by virtual reality engine 1826 may be used for producing a signal (e.g., display instructions) to display module 1860. For example, if the received information indicates that the user has looked to the left, virtual reality engine 1826 may generate content for the HMD device that mirrors the user's movement in a virtual environment. Additionally, virtual reality engine 1826 may perform an action within an application in response to an action request received from user input/output module 1870 and provide feedback to the user. The provided feedback may be visual, audible, or haptic feedback. In some implementations, processor(s) 1810 may include one or more GPUs that may execute virtual reality engine 1826.

In various implementations, the above-described hardware and modules may be implemented on a single device or on multiple devices that can communicate with one another using wired or wireless connections. For example, in some implementations, some components or modules, such as GPUs, virtual reality engine 1826, and applications (e.g., tracking application), may be implemented on a console separate from the head-mounted display device. In some implementations, one console may be connected to or support more than one HMD.

In alternative configurations, different and/or additional components may be included in electronic system 1800. Similarly, functionality of one or more of the components can be distributed among the components in a manner different from the manner described above. For example, in some embodiments, electronic system 1800 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. An optical device comprising:
   a surface-relief grating including a plurality of ridges and a plurality of grooves, wherein the plurality of grooves is characterized by a depth greater than 50 nm; and
   an overcoat layer filled in the plurality of grooves and on top of the plurality of ridges, wherein:
   the overcoat layer includes an organic material;
   a thickness of the overcoat layer on top of the plurality of ridges is equal to or less than 20 nm and is greater than 0 nm; and
   a surface peak-to-valley height of a top surface of the overcoat layer is equal to or less than 5 nm and is greater than 0 nm.

2. The optical device of claim 1, wherein the overcoat layer is characterized by a refractive index between 1.45 and 3.4.

3. The optical device of claim 1, wherein the overcoat layer includes:
   a resin; and
   nanoparticles dispersed in the resin, the nanoparticles including titanium oxide, zirconium oxide, hafnium oxide, tungsten oxide, zinc tellurium, gallium phosphide, a derivative of any of preceding materials, or a combination thereof.

4. The optical device of claim 1, wherein the plurality of grooves is characterized by at least one of a non-uniform depth, a non-uniform pitch, a non-uniform width, or a non-uniform slant angle.

5. The optical device of claim 1, wherein the overcoat layer includes nanoparticles dispersed in the organic material, the nanoparticles characterized by linear dimensions less than 20 nm and greater than the surface peak-to-valley height of the top surface of the overcoat layer.

* * * * *